(12) United States Patent
Hatanaka et al.

(10) Patent No.: US 11,790,925 B2
(45) Date of Patent: Oct. 17, 2023

(54) INFORMATION PROCESSING DEVICE AND METHOD, AND PROGRAM

(71) Applicant: Sony Corporation, Tokyo (JP)

(72) Inventors: Mitsuyuki Hatanaka, Kanagawa (JP); Toru Chinen, Kanagawa (JP); Minoru Tsuji, Chiba (JP); Hiroyuki Honma, Chiba (JP); Yuki Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 253 days.

(21) Appl. No.: 17/255,191

(22) PCT Filed: Jun. 20, 2019

(86) PCT No.: PCT/JP2019/024441
§ 371 (c)(1),
(2) Date: Dec. 22, 2020

(87) PCT Pub. No.: WO2020/008890
PCT Pub. Date: Jan. 9, 2020

(65) Prior Publication Data
US 2021/0272576 A1 Sep. 2, 2021

(30) Foreign Application Priority Data

Jul. 4, 2018 (JP) ................................. 2018-127547
Jul. 12, 2018 (JP) ................................. 2018-132490

(51) Int. Cl.
*G10L 19/035* (2013.01)
*G10L 21/00* (2013.01)

(52) U.S. Cl.
CPC ............ *G10L 19/035* (2013.01); *G10L 21/00* (2013.01)

(58) Field of Classification Search
CPC ...................................................... G10L 21/00
See application file for complete search history.

(56) References Cited

U.S. PATENT DOCUMENTS 5,754,189 A * 5/1998 Doi ........................... G06T 1/00
345/473
2004/0210546 A1* 10/2004 Spooner ................ G06T 7/0004
706/45

(Continued)

FOREIGN PATENT DOCUMENTS

EP          2 928 216         10/2015
JP         2015-531078 A      10/2015
WO    WO-2019012131 A1 *      1/2019  ............... G06F 3/01

OTHER PUBLICATIONS

Sim, Jae-Young, and Sang-Uk Lee. "Compression of 3-D point visual data using vector quantization and rate-distortion optimization." IEEE Transactions on Multimedia 10.3 (2008): 305-315. (Year: 2008).*

(Continued)

*Primary Examiner* — Brian L Albertalli
(74) *Attorney, Agent, or Firm* — Wolf, Greenfield & Sacks, P.C.

(57) ABSTRACT

The present technology relates to an information processing device and method, and a program capable of reducing a code amount.
The information processing device includes: an acquisition unit that acquires space information regarding a position and a size of a child space within a parent space and position information in the child space indicating a position of an object within the child space, the child space being included in the parent space, and the object being included in the child space; and a calculation unit that calculates position information in the parent space indicating a position of the object within the parent space on the basis of the space information and the position information in the child space. The present technology can be applied to a signal processing device.

14 Claims, 29 Drawing Sheets

(56) References Cited

U.S. PATENT DOCUMENTS

2011/0184685 A1* 7/2011 Tanigawa ............... G06V 20/36
  707/769
2016/0104491 A1* 4/2016 Lee ...................... G10L 19/008
  381/22
2020/0359149 A1* 11/2020 Wübbolt ................ H04S 3/002

OTHER PUBLICATIONS

Goldstone, Will. Unity 3. x game development essentials. Packt Publishing Ltd, 2011. (Year: 2011).*
International Search Report and Written Opinion and English translations thereof dated Apr. 2, 2019 in connection with International Application No. PCT/JP2019/02444.
International Preliminary Report on Patentability and English translation thereof dated Sep. 24, 2020 in connection with International Application No. PCT/JP2019/02444.
Kassidas et al., Synchronization of batch trajectories using dynamic time warping. AIChE Journal. Apr. 1998;44(4):864-75.
Suzuki et al., An Online Anomaly Detection System Supporting Batch-Process Operator Decision-Making. Techical Review. Apr. 4, 2018, No. 59, pp. 14-20. URL:https://www.azbil.com/corporate/technology/review/pdf/rev201 8E_2.pdf [retrieved Dec. 15, 2020].
Extended European Search Report dated Oct. 7, 2021 in connection with European Application No. 19830739.9.
[No Author Listed], ISO/IEC DIS 23008-3 Information technology—High efficiency coding and media delivery in heterogeneous environments—Part 3: 3D audio. Dated Jul. 25, 2014. 433 pages.

* cited by examiner

FIG. 4

| DIVISION INDEX | NUMBER OF DIVISIONS |
|---|---|
| 0 | 0 |
| 1 | 1 |
| 2 | 2 |
| 3 | 4 |
| 4 | 8 |
| 5 | 16 |
| 6 | 32 |
| 7 | 64 |
| 8 | 128 |
| 9 | 256 |
| 10 | 512 |

FIG. 5

| DIVISION INDEX | NUMBER OF DIVISIONS OF ONE SIDE OF ONE QUADRANT | QUANTIZATION STEP WIDTH | QUANTIZED VALUE | BIT NOTATION | TRANSMITTED BIT LENGTH | DECODED VALUE | ERROR WITH TRUE VALUE |
|---|---|---|---|---|---|---|---|
| 0 | 1 | 1 | 0 | 0 | 0 (NO TRANSMISSION) | 0.5 | −0.3 |
| 1 | 2 | 0.5 | 0 | 0 | 1 | 0.25 | −0.05 |
| 2 | 4 | 0.25 | 0 | 00 | 2 | 0.125 | 0.075 |
| 3 | 8 | 0.125 | 1 | 001 | 3 | 0.1875 | 0.0125 |
| 4 | 16 | 0.0625 | 3 | 0011 | 4 | 0.21875 | −0.01875 |
| 5 | 32 | 0.03125 | 6 | 00110 | 5 | 0.203125 | −0.00312 |
| 6 | 64 | 0.015625 | 12 | 001100 | 6 | 0.195313 | 0.004688 |
| 7 | 128 | 0.0078125 | 25 | 0011001 | 7 | 0.199219 | 0.000781 |
| 8 | 256 | 0.0039063 | 51 | 00110011 | 8 | 0.201172 | −0.00117 |
| 9 | 512 | 0.0019531 | 102 | 001100110 | 9 | 0.200195 | −0.0002 |
| 10 | 1024 | 0.0009766 | 204 | 0011001100 | 10 | 0.199707 | 0.000293 |
| 11 | 2048 | 0.0004883 | 409 | 00110011001 | 11 | 0.199951 | 4.88E-05 |

```
xyz_header() {
  absoluteDistance;
  ChildAreaInfo();
  nobjs;
  for(i=0; i<nobjs; i++) {
    ChildAreaIndexForObj[i];
  }
}
```

FIG. 12

```
ChildAreaInfo() {
  numOfChildArea;
  for(i=0; i<numOfChildArea; i++) {
    max_exp_index_X[i];
    max_exp_index_Y[i];
    max_exp_index_Z[i];
    a_x[i];
    b_x[i];
    a_y[i];
    b_y[i];
    a_z[i];
    b_z[i];
  }
}
```

FIG. 13

```
xyz_request_initial() {
  for(i=0; i<nobjs; i++) {
    exp_index_initial_x[i];
    exp_index_initial_y[i];
    exp_index_initial_z[i];
  }
}
```

FIG. 14

```
xyz_obj_initial_pos(nobjs) {
  for(i=0; i<nobjs; i++) {
     Xpos_initial[i];
     Ypos_initial[i];
     Zpos_initial[i];
  }
}
```

FIG. 15

```
AppendRequest(){
  request_mode
  switch (request_mode){
   case 0:
    addbit_x;
    addbit_y;
    addbit_z;
    break;
   case 1:
    num_of_addprec_childArea;
    for(i=0; i<num_of_addprec_scalingarea; i++){
      addprec_childArea_index[i];
      addbit_x[i];
      addbit_y[i];
      addbit_z[i];
    }
    break;
   case 2:
    num_of_addprec_objects;
    for(i=0; i<num_of_resend_objects; i++){
      addprec_object_index[i];
      addbit_x[i];
      addbit_y[i];
      addbit_z[i];
    }
}
```

FIG. 16

```
xyz_obj_pos_addprec() {
  switch (request_mode) {
    case 0:
      for (i = 0; i < nobjs; i++) {
        Xpos_add[i];
        Ypos_add[i];
        Zpos_add[i];
      }
      break;
    case 1:
      for (i = 0; i < num_of_addprec_scalingarea; i++) {
        for (j = 0; j < nobjs; j++) {
          if (scalingAreaIndex[j] == i) {
            Xpos_add[j];
            Ypos_add[j];
            Zpos_add[j];
          }
        }
      }
      break;
    case 2:
      for (i = 0; i < num_of_addprec_objects; i++) {
        Xpos_add[addprec_object_index[i]];
        Ypos_add[addprec_object_index[i]];
        Zpos_add[addprec_object_index[i]];
      }
      break;
  }
}
```

FIG. 26

```
xyz_header() {
  absoluteDistance;
  ChildAreaInfo();
  nobjs;
  for(i=0; i<nobjs; i++) {
    numOfAttChildArea
    for(i=0; i<numOfAttChildArea; i++) {
      ChildAreaIndexForObj[i];
    }
  }
}
```

FIG. 27

```
ChildAreaInfo() {
  numOfChildArea;
  for(i=0; i<numOfChildArea; i++) {
    max_exp_index_X[i];
    max_exp_index_Y[i];
    max_exp_index_Z[i];
    a_x[i];
    b_x[i];
    a_y[i];
    b_y[i];
    a_z[i];
    b_z[i];
  }
}
```

FIG. 29

```
xyz_request_initial() {
    SkipFrameRequest;
    for(i=0; i<nobjs; i++) {
        exp_index_initial_x[i];
        exp_index_initial_y[i];
        exp_index_initial_z[i];
    }
}
```

FIG. 30

```
xyz_obj_inital_pos(nobjs) {
  for(i=0; i<nobjs; i++) {
    if (NUMBER OF REQUEST SKIP FRAMES != 0) {
      InterpolMode[i];
    }
      Xpos_initial[i];
      Ypos_initial[i];
      Zpos_initial[i];
  }
}
```

INFORMATION PROCESSING DEVICE AND METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/024441, filed in the Japanese Patent Office as a Receiving Office on Jun. 20, 2019, which claims priority to Japanese Patent Application Number JP2018-132490, filed in the Japanese Patent Office on Jul. 12, 2018 and Japanese Patent Application Number JP2018-127547, filed in the Japanese Patent Office on Jul. 4, 2018, each of which is hereby incorporated by reference in its entirety.

TECHNICAL FIELD

The present technology relates to an information processing device and method, and a program, and more particularly, to an information processing device and method, and a program capable of reducing a code amount.

BACKGROUND ART

A moving picture experts group (MPEG)-H encoding standard standardized as a conventional three-dimensional (3D) Audio for a fixed viewpoint is based on the idea that an audio object moves in a space around a listener's position as is an origin (see, for example, Non-Patent Document 1).

On the other hand, a technology regarding a free viewpoint in which the listener can freely move in a space, that is, a viewpoint position (listening position) of the listener can be freely moved has also been proposed.

CITATION LIST

Non-Patent Document

Non-Patent Document 1: ISO/IEC 23008-3 Information technology—High efficiency coding and media delivery in heterogeneous environments—Part 3: 3D audio

SUMMARY OF THE INVENTION

Problems to be Solved by the Invention

For example, in audio reproduction for a free viewpoint, in a case where a position of each object existing in a space is transmitted, encoding of position information is performed on an entire space in which all the objects are included. That is, the position information of the objects in a coordinate system including the entire space is encoded.

However, there is a bias in existing places of the objects in the entire space, and the objects may be concentrated in a specific region in the space. In such a case, when the position information of the objects is normalized and encoded for the entire space, an information amount (code amount) for expressing even a region where the object does not actually exist is required. As a result, a transmitted code amount increases.

The present technology has been made in view of such a situation, and makes it possible to reduce a code amount.

Solutions to Problems

An information processing device according to an aspect of the present technology includes: an acquisition unit that acquires space information regarding a position and a size of a child space within a parent space and position information in the child space indicating a position of an object within the child space, the child space being included in the parent space, and the object being included in the child space; and a calculation unit that calculates position information in the parent space indicating a position of the object within the parent space on the basis of the space information and the position information in the child space.

An information processing method or a program according to an aspect of the present technology includes: acquiring space information regarding a position and a size of a child space within a parent space and position information in the child space indicating a position of an object within the child space, the child space being included in the parent space, and the object being included in the child space; and calculating position information in the parent space indicating a position of the object within the parent space on the basis of the space information and the position information in the child space.

In an aspect of the present technology, space information regarding a position and a size of a child space, which is included in a parent space, within the parent space and position information in the child space indicating a position of an object, which is included in the child space, within the child space are acquired, and position information in the parent space indicating a position of the object within the parent space is calculated on the basis of the space information and the position information in the child space.

Effects of the Invention

According to an aspect of the present technology, a code amount can be reduced.

Note that an effect described here is not necessarily limited, and may be any effect described in the present disclosure.

BRIEF DESCRIPTION OF DRAWINGS

FIG. 4 is a diagram illustrating an example of a division index and the number of divisions.

FIG. 5 is a diagram illustrating a quantization example of position information in the child space.

FIG. 12 is a diagram illustrating an example of child space information.

FIG. 13 is a diagram illustrating an example of an initial quantized position information transmission request.

FIG. 14 is a diagram illustrating an example of initial quantized position information.

FIG. 15 is a diagram illustrating an example of an additional bit information transmission request.

FIG. 16 is a diagram illustrating an example of additional bit information.

FIG. 26 is a diagram illustrating an example of header information.

FIG. 27 is a diagram illustrating an example of child space information.

FIG. 29 is a diagram illustrating an example of an initial quantized position information transmission request.

FIG. 30 is a diagram illustrating an example of initial quantized position information.

MODE FOR CARRYING OUT THE INVENTION

Hereinafter, embodiments to which the present technology is applied will be described with reference to the drawings.

First Embodiment

<Concerning Present Technology>

The present technology makes it possible to reduce a code amount by converting position information of an object existing in a predetermined space into position information in a child space smaller than the space and quantizing the converted position information.

In particular, the present technology has the following features T(1) to T(4).

Feature T(1)

A scaled space (child space) including an existence range of an object, which is a target to be encoded, is formed from an entire space (parent space)

Feature T(2)

After scaling conversion from the parent space to the child space is performed, encoding and decoding are performed, and inverse scaling conversion from the child space to the parent space is performed on position information of the object of the decoded child space to restore the object on the parent space Feature T(3)

A plurality of different spaces is arranged as child spaces and a listener selectively receives and reproduces a desired child space Feature T(4)

A decoding side generates position information of the object interpolated from a current playback position to a frame immediately before a skip frame destination based on transmitted skip frame information and interpolation information Note that the position information of the object, which is the target to be encoded, in the present technology is not limited to position information indicating a position of an audio object, and may be any position information such as position information or the like indicating a position of a video object on an image or in a virtual space. Hereinafter, an example of encoding and decoding the position information of the audio object will be described.

Then, the present technology will hereinafter be described in more detail.

Figure 1:
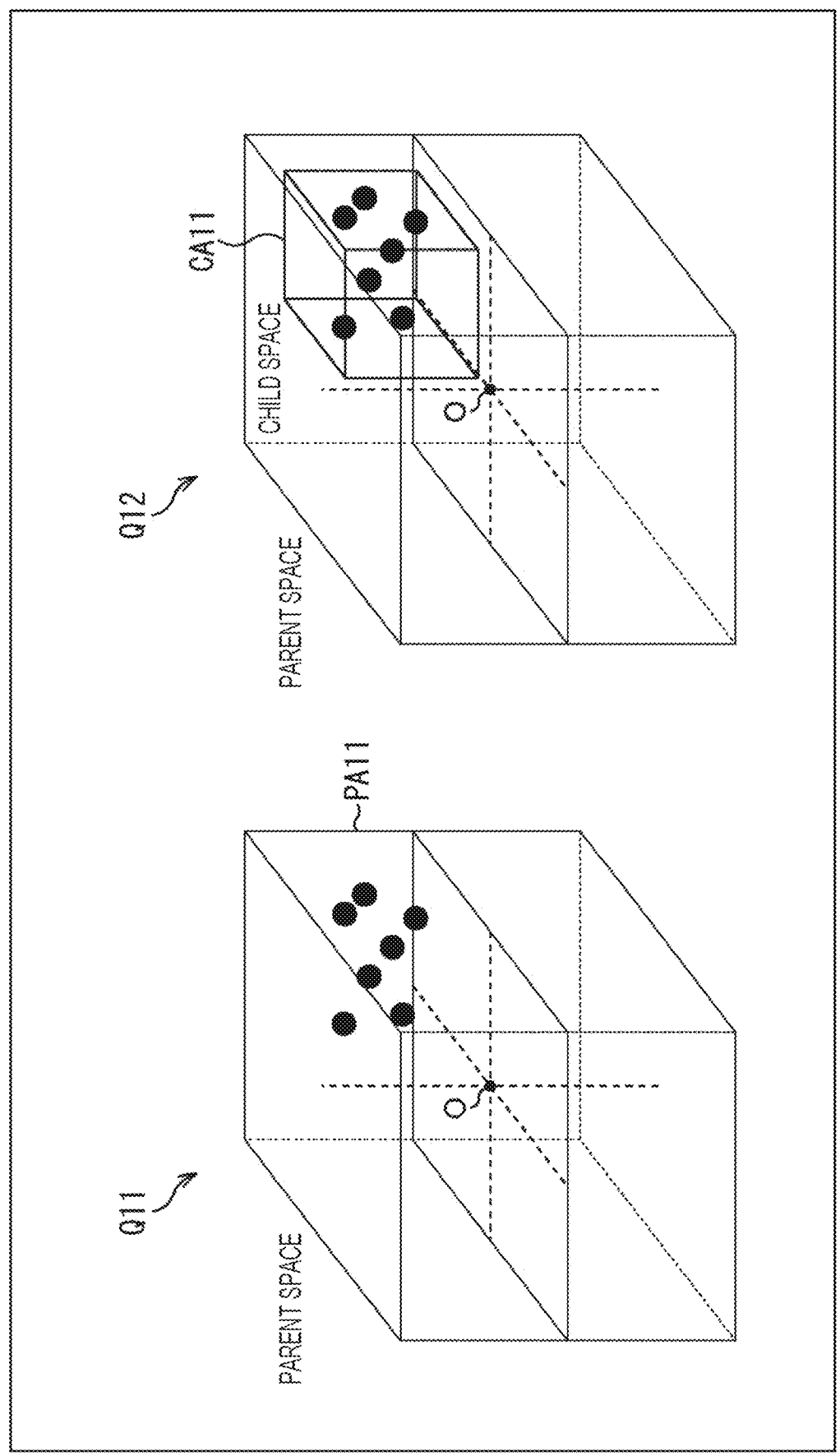
FIG. 1 is a diagram for describing a parent space and a child space.

First, a case where there is a region of a group of objects locally concentrated in a parent space PA11, which is an entire space of a three-dimensional absolute coordinate system as illustrated by arrow Q11 of FIG. 1 is considered. Note that in FIG. 1, each circle represents an object (audio object).

Here, the parent space PA11 is a space represented by absolute coordinates, and a position in the parent space PA11 is represented by the absolute coordinates. In other words, the parent space PA11 is a coordinate space of the absolute coordinate system. Note that the parent space may be a coordinate space of another coordinate system different from the absolute coordinate system, such as, for example, a polar coordinate system or the like, but a description will hereinafter be continued by taking a case where the parent space is the coordinate space of the absolute coordinate system as an example.

For example, in a case of expressing a position of the object in the parent space PA11, it is general to represent a position of the object viewed from an origin O of the three-dimensional absolute coordinate system in the parent space PA11 by three-dimensional absolute coordinates.

On the other hand, in the present technology, a device on an encoding side, that is, an encoder detects a distribution situation of the objects in the parent space PA11, and sets a small space surrounding a group of objects locally concentrated according to a detection result as a child space. In this example, a scaled small space in which a plurality of objects is included, for example, as illustrated by arrow Q12, is a child space CA11.

Here, the child space CA11 included in the parent space PA11 is a space represented by absolute coordinates, and in the present technology, a position in the child space CA11 is represented by absolute coordinates. In other words, the child space CA11 is a coordinate space of the absolute coordinate system. Note that the child space may be a coordinate space of another coordinate system different from the absolute coordinate system, such as, for example, a polar coordinate system or the like, but a description will hereinafter be continued by taking a case where the child space is the coordinate space of the absolute coordinate system as an example.

In the present technology, the position of the object in the parent space PA11 is not expressed by coordinates of the absolute coordinate system of the parent space PA11, and is expressed by child space information regarding a position and a size of the child space CA11 in the parent space PA11 and coordinates of the position of the object in the absolute coordinate system of the child space CA11.

Here, the coordinate system of the parent space PA11 and the coordinate system of the child space CA11 will be described with reference to FIG. 2. Note that in FIG. 2, portions corresponding to those in FIG. 1 will be denoted by the same reference numerals, and a description thereof will be appropriately omitted.

Figure 2:
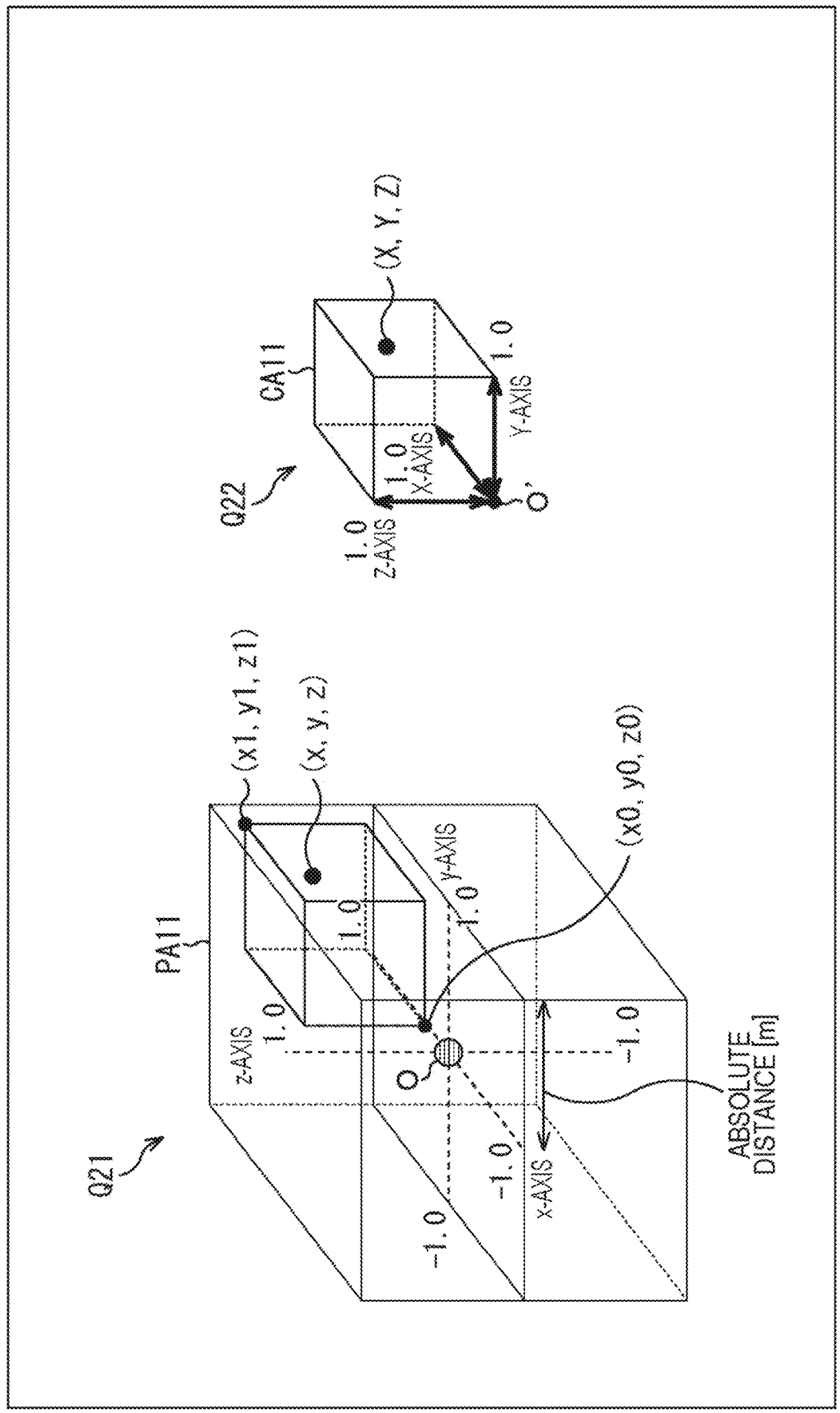
FIG. 2 is a diagram for describing a coordinate system of the parent space and the child space.

For example, as illustrated by arrow Q21 in FIG. 2, the parent space PA11 is a coordinate space of an absolute coordinate system that uses the center of a cube handled by moving picture experts group (MPEG)-H as an origin O and includes a total of three axes, an x-axis, a y-axis, and a z-axis.

In the parent space PA11, in order to express a position in each axis direction, a normalized value from 0 to 1 for expressing a position from the origin O to an end and positive and negative sign information are required. That is, an x coordinate, a y coordinate, and a z coordinate indicating positions in each of an x-axis direction, a y-axis direction, and a z-axis direction are values from −1 to 1, respectively.

Hereinafter, the absolute coordinate system of the parent space PA11 with the origin O as a reference will also be referred to as an xyz coordinate system, and coordinates indicating a position in the xyz coordinate system will be referred to as (x, y, z).

Furthermore, in the parent space PA11, for example, an actual length (distance) from a position where the x coordinate is 0 to a position where the x coordinate is 1 is an absolute distance absoluteDistance of the parent space PA11 as described later. For example, the absolute distance absoluteDistance is described in units of meters.

On the other hand, as illustrated by arrow Q22, in coordinate representation of the absolute coordinate system of the child space CA11, positive and negative signs are not used from a point of view of facilitating encoding of position information.

Here, the child space CA11 has a cube or rectangular parallelepiped shape. Furthermore, the absolute coordinate system of the child space CA11 is configured so that a vertex of the child space CA11 corresponding to a position (−1, −1, −1) of the parent space PA11 is used as an origin O' and each side uses a normalized value from 0 to 1.

That is, the child space CA11 is a coordinate space of an absolute coordinate system that uses a left lower vertex of the child space CA11 in FIG. 2 as the origin O' and includes a total of three axes, an X-axis, a Y-axis, and a Z-axis.

Hereinafter, the absolute coordinate system of the child space CA11 with the origin O' as a reference will also be referred to as an XYZ coordinate system, and coordinates indicating a position in the XYZ coordinate system will be referred to as (X, Y, Z). In particular, here, coordinate values of X, Y, and Z are values between 0 and 1.

Note that a case where a coordinate value in each axis direction of the XYZ coordinate system is 0 or more will be described here, but the coordinate value in each axis direction may be a negative value. Furthermore, a shape of the child space CA11 is not limited to the cube or rectangular parallelepiped shape, and may be any shape.

In an example illustrated in FIG. 2, coordinates of the xyz coordinate system indicating a position of the origin O' of the child space CA11 in the parent space PA11 are (x0, y0, z0), and coordinates of the xyz coordinate system indicating a position of a diagonal vertex of the origin O' of the child space CA11 are (x1, y1, z1).

Note that information indicating a position of an object in the xyz coordinate system, that is, a position of an object in the parent space, will hereinafter be also referred to as position information in the parent space. Furthermore, information indicating a position of an object in the XYZ coordinate system, that is, a position of an object in the child space, will hereinafter be also referred to as position information in the child space.

By the way, for example, in a case of encoding the position information indicating the position of the object, input information indicating the position of the object is the position information in the parent space indicating the position in the parent space. Therefore, in the present technology, coordinate conversion (scaling conversion) from the parent space to the child space, that is, from the position information in the parent space to the position information in the child space is performed.

Now, when an index indicating an i-th child space that is in the parent space is i and coordinate conversion of the coordinates (x, y, z), which is the position information in the parent space, into the coordinates (X, Y, Z), which is the position information in the child space of the i-th child space is performed, a conversion equation is as illustrated in the following Equation (1).

[Math. 1]

$$X = a\_x[i] \times x + b\_x[i]$$

$$Y = a\_y[i] \times y + b\_y[i]$$

$$Z = a\_z[i] \times z + b\_z[i] \quad (1)$$

In Equation (1), $0 \leq X \leq 1$, $0 \leq Y \leq 1$, and $0 \leq Z \leq 1$. Furthermore, in Equation (1), a_x[i], b_x[i], a_y[i], b_y[i], a_z[i], and b_z[i] are scaling conversion coefficients of the i-th child space, and are shown in the following Equation (2).

[Math. 2]

$$a\_x[i] = 1/(x1[i] - x0[i])$$

$$b\_x[i] = -x0[i]/(x1[i] - x0[i])$$

$$a\_y[i] = 1/(y1[i] - y0[i])$$

$$b\_y[i] = -y0[i]/(y1[i] - y0[i])$$

$$a\_z[i] = 1/(z1[i] - z0[i])$$

$$b\_z[i] = -z0[i]/(z1[i] - z0[i]) \quad (2)$$

Note that in Equation (2), x0[i], y0[i], and z0[i] indicate an x coordinate, a y coordinate, and a z coordinate of the xyz coordinate system indicating the position of the origin O' of the i-th child space, respectively, and correspond to (x0, y0, z0) described above. Furthermore, x1[i], y1[i], and z1[i] indicate an x coordinate, a y coordinate, and a z coordinate of the xyz coordinate system indicating the position of the diagonal vertex with respect to the origin O' of the i-th child space, respectively, and correspond to (x1, y1, z1) described above.

Therefore, here, as the coordinate conversion, function conversion using a linear function is performed for every axis of the coordinate system. Then, inclinations a_x[i], a_y[i], and a_z[i] of the linear functions for each axis and intercepts b_x[i], b_y[i], and b_z[i] of the linear functions are used as parameters of the linear functions.

For example, in the present technology, these six parameters in total can be used as child space information regarding the position and the size of the child space in the parent space. These parameters of the linear functions are obtained from the coordinates (x0, y0, z0) of the origin O' of the child space and the coordinates (x1, y1, z1) of the diagonal vertex, and it can thus be said that they are substantially information indicating the position and the size of the child space in the parent space.

Note that in a case where it is desired to directly acquire the information indicating the position of the child space in the parent space from a bit stream, instead of the parameters of the linear functions shown in Equation (2) as the child space information, the coordinates (x0, y0, z0) of the origin O' of the child space in the parent space and the coordinates (x1, y1, z1) of the diagonal vertex of the child space with respect to the origin O' may be transmitted as the child space information as they are.

However, a calculation amount on the decoding side is reduced in a case where the parameters of the linear functions are transmitted as the child space information as compared with a case where the coordinates (x0, y0, z0) of the origin O', which is a vertex that becomes a reference of the child space, and the coordinates (x1, y1, z1) of the diagonal vertex are transmitted as the child space information.

Furthermore, in a case where a group of objects exists at a plurality of places in the parent space, a plurality of child spaces may be formed for one parent space.

Normalizing the position information of the object according to the child space limited to a range in which the object, which is the target to be encoded, exists as such is a similar relationship to applying a scale factor according to a magnitude of a spectrum of existing audio encoding.

Determination of the position, the size, or the shape of the child space is entrusted to the encoder, but it is desirable that the child space includes all the objects, which are the target, and has the smallest volume.

When the coordinates (X, Y, Z), which are the position information in the child space, are obtained by the coordinate conversion described above, the position information in the child space is quantized with predetermined quantization accuracy to become quantized position information.

Figure 3:
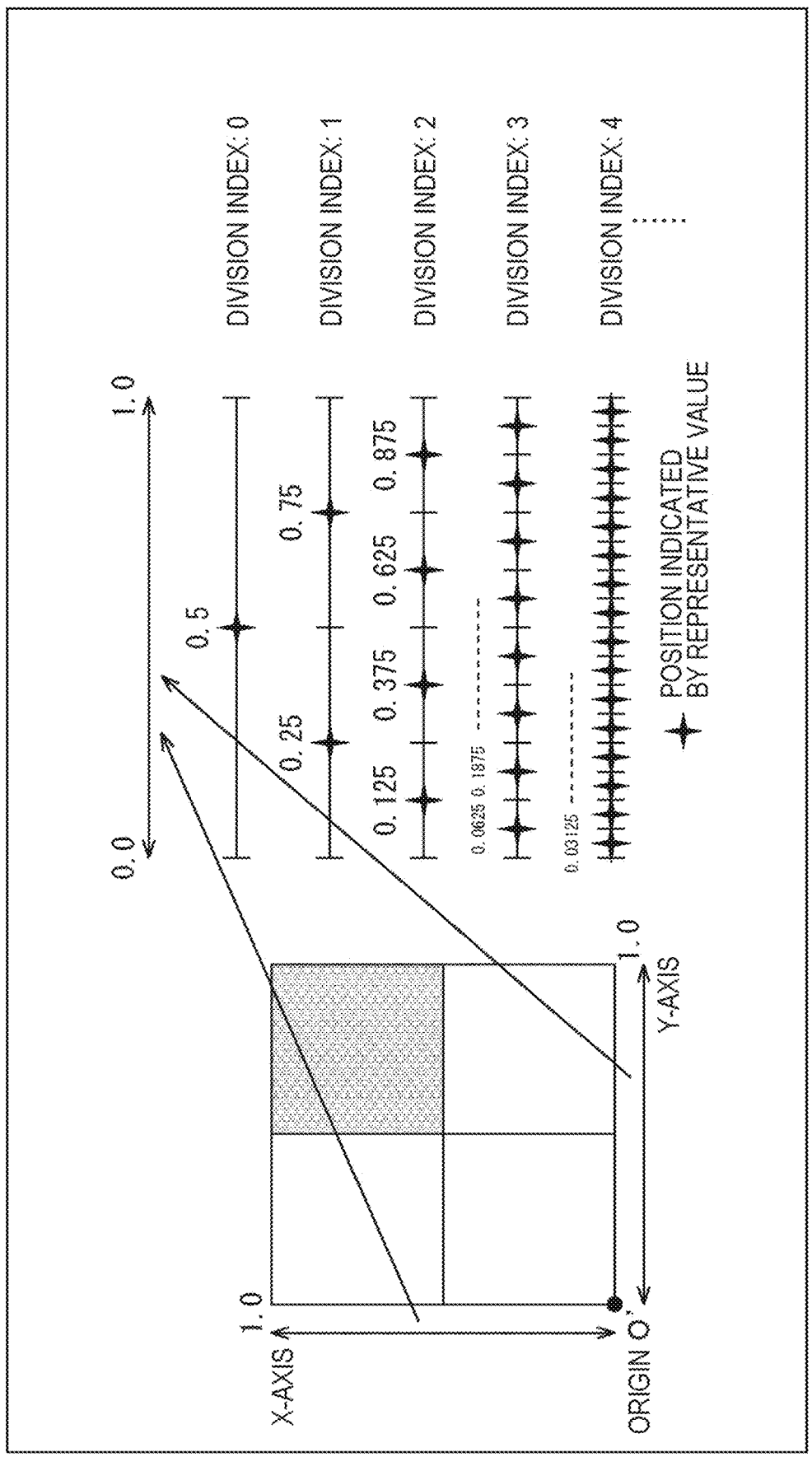
FIG. 3 is a diagram for describing quantization.

In quantization processing, for example, as illustrated in FIG. 3, one side of the child space, that is, a side in one axis direction is normalized from 0 to 1, and a median of a divided region of a power of 2 for one side is a value after quantization. Note that in FIG. 3, for the purpose of simplicity of explanation, the child space is illustrated to be two-dimensional in an X-axis direction and a Y-axis direction.

For example, a range in each axis direction of the child space, that is, a range of coordinates of each axis is from 0 to 1, but this range is divided into $2^n$ (here, $0 \leq n$) as illustrated on a right side in FIG. 3, and a median of each range after being divided is a representative value that can be taken as the value after quantization.

A value of n (exponent part) when the range in each axis direction is divided into $2^n$ will hereinafter be referred to as a division index in particular. This division index indicates how many the range in each axis direction is divided by a power of 2.

For example, in an example illustrated in FIG. 3, in a case where a value of the division index is 0, the range in each axis direction is divided into 0, that is, is not substantially divided, so the coordinates (X, Y, Z), which are the position information in the child space, are (0.5, 0.5, 0.5).

Furthermore, for example, in a case where a value of the division index is 1, the range in each axis direction is divided into 2, so the coordinates of each axis of the position information in the child space are a value of either 0.25 or 0.75. Note that in FIG. 3, a position of a wedge mark represents a representative value after quantization.

In a case where the quantization is performed as such, the greater the power of 2, that is, the number of divisions determined by the division index, the higher the quantization accuracy.

Here, FIG. 4 illustrates the number of divisions in the range in each axis direction corresponding to the division index in a case where the division index is 0 to 10. In FIG. 4, for example, in a case where a value of the division index is 0, the number of divisions is 0, and in a case where a value of the division index is 10, the number of divisions is 512.

Next, a division index for quantizing the position information in the child space with the highest accuracy, that is, a division index for quantizing the position information in the child space with the smallest quantization step width is shown in the following Equation (3). However, here, it is assumed that a rule that the quantization is not performed at a distance less than or equal to a minimum distance MinDist from a listener to the object is applied. The minimum distance MinDist is a minimum possible distance from the listener to the object, and the minimum distance MinDist is determined so that the listener and the object do not overlap each other, for example, in consideration of a size of a listener's head.

$$\text{max\_exp\_index\_X} = \quad (3)$$
$$INT(\max(\{n \mid (1/2)^\wedge n < \text{Min}Dist/\text{absoluteDistance}X\}))$$
$$\text{max\_exp\_index\_Y} =$$
$$INT(\max(\{n \mid (1/2)^\wedge n < \text{Min}Dist/\text{absoluteDistance}Y\}))$$
$$\text{max\_exp\_index\_Z} =$$
$$INT(\max(\{n \mid (1/2)^\wedge n < \text{Min}Dist/\text{absoluteDistance}Z\}))$$

Note that in Equation (3), max_exp_index_X, max_exp_index_Y, and max_exp_index_Z indicate division indices (hereinafter also referred to as the highest accuracy division indices) of the X-axis (X-direction), the Y-axis (Y-direction), and the Z-axis (Z-direction) for quantizing the position information in the child space with the highest accuracy, respectively. Furthermore, in Equation (3), INT ( ) indicates an INT function that outputs an integer part of an argument, and "^" indicates a power.

Moreover, in Equation (3), absoluteDistanceX, absoluteDistanceY, and absoluteDistanceZ indicate actual distances (absolute distances) of sides in each of the X-axis direction, the Y-axis direction, and the Z-axis direction of the child space, and units of these absolute distances are, for example, meters (m). Similarly, units of the minimum distance MinDist from the listener to the object are also, for example, meters (m), and this minimum distance MinDist is a predetermined value such as a size of a general user's head.

When the highest accuracy division indices are obtained by Equation (3), quantization step widths for each axis of the XYZ coordinate system in the child space are obtained by the following Equation (4).

[Math. 4]

$$\text{step\_enc}X = (\tfrac{1}{2})^\wedge \text{max\_exp\_index\_}X$$

$$\text{step\_enc}Y = (\tfrac{1}{2})^\wedge \text{max\_exp\_index\_}Y$$

$$\text{step\_enc}Z = (\tfrac{1}{2})^\wedge \text{max\_exp\_index\_}Z \quad (4)$$

Note that in Equation (4), step_encX, step_encY, and step_encZ indicate quantization step widths with respect to the X-axis, Y-axis, and Z-axis of the XYZ coordinate system, and "^" indicates a power.

Moreover, by calculating the following Equation (5) using the quantization step widths obtained in this manner, Qpx_high[i], Qpy_high[i], and Qpz_high[i], which are an X coordinate, a Y coordinate, and a Z coordinate of quantized position information obtained by quantizing the position information (X, Y, Z) in the child space of the object in the child space with the highest accuracy, are obtained. Note that in Equation (5), i is an index indicating the child space.

[Math. 5]

$$Qpx\_high[i]=X/step\_enc$$

$$Qpy\_high[i]=Y/step\_enc$$

$$Qpz\_high[i]=Z/step\_enc \quad (5)$$

Note that quantized position information obtained by quantizing the position information in the child space particularly on the basis of the highest accuracy division index among the quantized position information obtained by quantizing the position information in the child space will hereinafter be referred to as the highest accuracy quantized position information.

Furthermore, here, concerning a method of determining the number of divisions of the region in each axis direction at the highest quantization accuracy, the minimum distance MinDist from the listener to the object has been used as a reference, but another reference may be used.

Moreover, since there is a case where a larger number of divisions are not required, such as a case where an absolute distance of the child space is small, or the like, if the number of divisions is limited by determining an upper limit division index of the highest accuracy division index according to the absolute distance of the space, an unnecessary bit length can be reduced.

In addition, a quantized value of the position information in the child space, that is, a value of the quantized position information, is obtained by performing division by the number of divisions of the power of 2. Therefore, by extracting the required bit length from the most significant bit (MSB) side of the highest accuracy quantized position information, quantized position information with arbitrary quantization accuracy can be obtained.

That is, for example, quantized position information in a case where a coordinate value "0.2" of a predetermined axis of the position information in the child space is quantized with each quantization accuracy, that is, each division number is illustrated in FIG. 5.

In FIG. 5, characters "division index", "number of divisions of one side of one quadrant", and "quantization step width" indicate the division index, the number of divisions in the range in one axis direction, and the quantization step width at the time of quantization described above, respectively.

Furthermore, "quantized value", "bit notation", and "transmitted bit length" indicate a coordinate value in one axis direction of the quantized position information (integer value), a bit notation of the coordinate value in one axis direction of the quantized position information, and a bit length of the coordinate value in one axis direction of the quantized position information, respectively. Moreover, "decoded value" and "error with true value" indicates a coordinate value in one axis direction of the position information in the child space obtained by decoding the quantized position information and an error between the coordinate value in one axis direction of the position information in the child space after decoding and the coordinate value in one axis direction of the position information in the child space before quantization, respectively.

Here, for example, assuming that the highest accuracy division index is "11", the bit notation of the quantized value when the quantization is performed with the highest accuracy division index is "00110011001".

Furthermore, for example, the bit notation of the quantized value when the quantization is performed with a division index "10" having a smaller number of divisions, that is, lower quantization accuracy, than the highest accuracy division index is "0011001100".

Therefore, it can be seen that when bits are extracted by a bit length (10 bits) indicated by the division index "10" from the most significant bit side of the quantized value "00110011001" of the highest accuracy quantized position information, the quantized value "0011001100" corresponding to the division index "10" can be obtained.

That is, by extracting bits of the highest accuracy quantized position information by a bit length corresponding to the division index from the most significant bit side of the highest accuracy quantized position information, quantized position information with an arbitrary division index, that is, arbitrary quantization accuracy can be obtained.

As described above, processing for performing the determination of the child space, the coordinate conversion of the position information in the parent space into the position information in the child space, and the quantization of the position information in the child space is performed as encoding processing of the position information in the parent space.

Next, decoding of the quantized position information will be described. Inverse quantization of the quantized position information and inverse conversion of the position information in the child space obtained by the inverse quantization into the position information in the parent space are performed as decoding processing.

For example, the X coordinate, the Y coordinate, and the Z coordinate of the quantized position information are Qpx_dec, Qpy_dec, and Qpz_dec, respectively, and division indices of the X coordinate, the Y coordinate, and the Z coordinate are exp_index_fin_X, exp_index_fin_Y, and exp_index_fin_Z, respectively. In particular, an index indicating the child space is referred to as i, and the division indices exp_index_fin_X, exp_index_fin_Y, and exp_index_fin_Z for the child space are referred to as division indices exp_index_fin_X[i], exp_index_fin_Y[i], and exp_index_fin_Z[i], respectively.

Furthermore, an X coordinate, a Y coordinate, and a Z coordinate of position information in the child space (hereinafter, also referred to as decoded position information in the child space) obtained by inversely quantizing the quantized position information are Xdec, Ydec, and Zdec, respectively.

In this case, in the inverse quantization, calculation of the following Equation (6) is performed, such that the decoded position information in the child space is obtained. Note that in Equation (6), i is an index indicating the child space to which the object belongs, and "^" indicates a power.

$$Xdec = \qquad (6)$$

$$Qpx\_dec \times (1/2)^{\wedge}exp\_index\_fin\_X[i] + (1/2)^{\wedge}exp\_index\_fin\_X[i]/2$$

$$Ydec =$$

$$Qpy\_dec \times (1/2)^{\wedge}exp\_index\_fin\_Y[i] + (1/2)^{\wedge}exp\_index\_fin\_Y[i]/2$$

$$Zdec =$$

$$Qpz\_dec \times (1/2)^{\wedge}exp\_index\_fin\_Z[i] + (1/2)^{\wedge}exp\_index\_fin\_Z[i]/2$$

Subsequently, when inverse scaling conversion shown in the following Equation (7) is performed on the coordinates (Xdec, Ydec, Zdec) of the decoded position information in the child space obtained in this manner, the coordinates (xdec, ydec, zdec) of the original position information in the parent space can be obtained. Calculation of Equation (7) is inverse conversion of the abovementioned Equation (1). Note that in Equation (7), i is an index indicating the child space to which the object belongs.

[Math. 7]

$$xdec = a'\_x[i]Xdec + b'\_x[i]$$

$$ydec = a'\_y[i]Ydec + b'\_y[i]$$

$$zdec = a'\_z[i]Zdec + b'\_z[i] \qquad (7)$$

Furthermore, in Equation (7), a'_x[i], b'_x[i], a'_y[i], b'_y[i], a'_z[i], and b'_z[i] are inverse scaling conversion coefficients from the i-th child space to the parent space, and are represented by the following Equation (8) using a_x[i], b_x[i], a_y[i], b_y[i], a_z[i], and b_z[i] as the child space information.

[Math. 8]

$$a'\_x[i] = 1/a\_x[i]$$

$$b'\_x[i] = -b\_x[i]/a\_x[i]$$

$$a'\_y[i] = 1/a\_y[i]$$

$$b'\_y[i] = -b\_y[i]/a\_y[i]$$

$$a'\_z[i] = 1/a\_z[i]$$

$$b'\_z[i] = -b\_z[i]/a\_z[i] \qquad (8)$$

By the above decoding processing, the coordinates (xdec, ydec, zdec) are obtained as position information in the parent space indicating the position of the object in the parent space. Note that the position information in the parent space obtained by the decoding processing will hereinafter be appropriately referred to as decoded position information in the parent space.

By converting the position information in the parent space into the position information in the child space and then performing the quantization as in the present technology, a code amount of the quantized position information can be reduced as compared with a case where the position information in the parent space is quantized as it is. In other words, a transmitted code amount of the position information of the object can be reduced.

Figure 6:
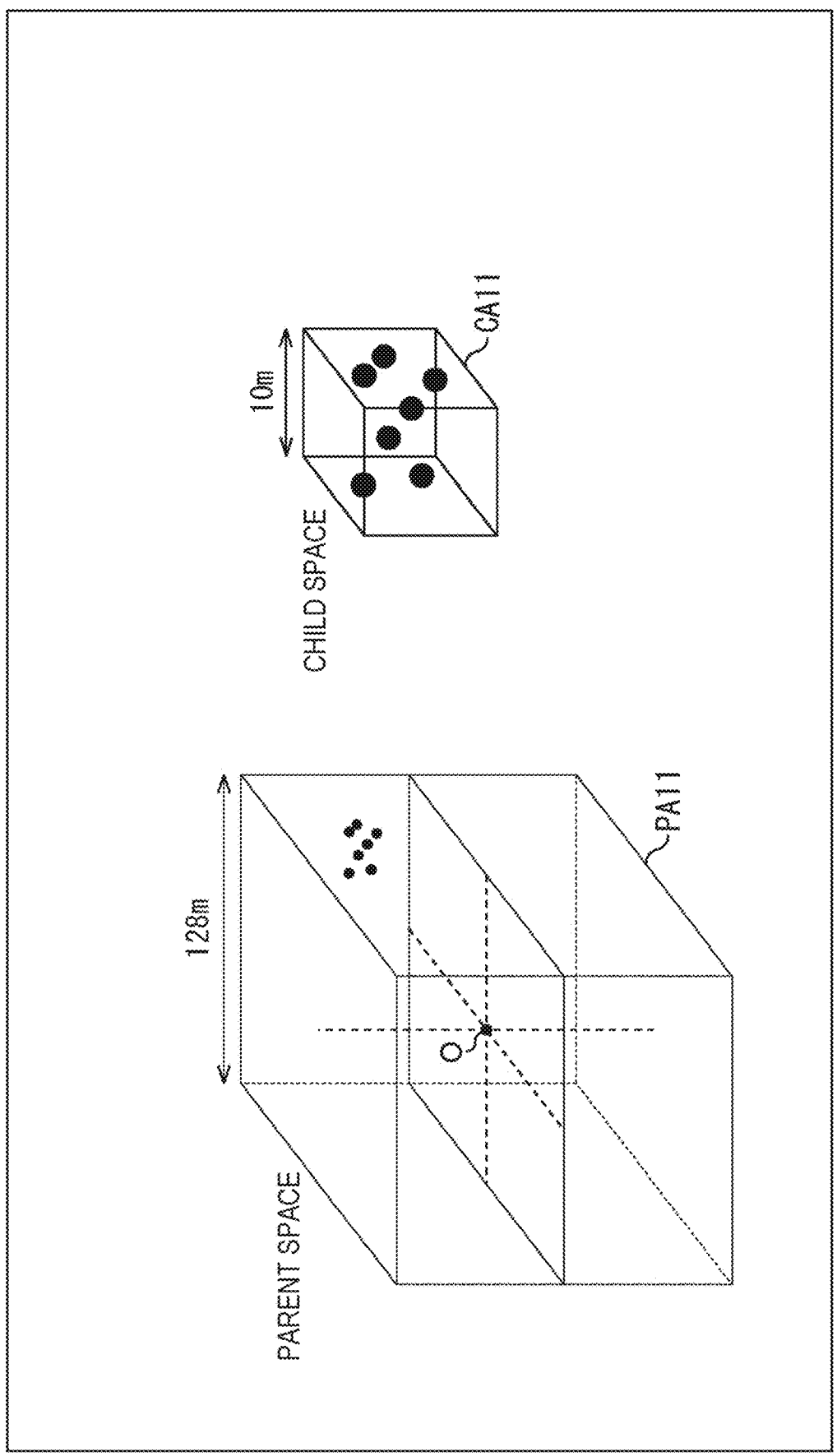
FIG. 6 is a diagram for describing a difference in a used bit length.

Specifically, for example, as illustrated in FIG. 6, it is considered that a plurality of objects is concentrated and exists in a partial region in the parent space PA11 and to form a child space CA11 and encode position information of the objects. Note that in FIG. 6, portions corresponding to those in FIG. 1 will be denoted by the same reference numerals, and a description thereof will be appropriately omitted.

In an example illustrated in FIG. 6, each circle represents one object, and a length of one side of a parent space PA11, which is a cube, is 128 m. A child space CA11 of a cube included in the parent space PA11 is formed with respect to this parent space PA11, and a length of one side of the child space CA11 is 10 m.

In such a case, for example, an encoded bit length per axis of a coordinate system required for making accuracy of a position 0.2 m or less with respect to a true value of position information in the parent space is 9 bits in the parent space PA11 and 5 bits in the child space CA11. That is, when one side of a coordinate space is 128 m, 9 bits are required, and when one side of the coordinate space is 10 m, 5 bits are required.

Therefore, since coordinates of each coordinate space have three axes, for example, in a case where the position information in the parent space is quantized as it is, 27 bits are required as a bit length of the quantized position information, whereas in a case where the position information in the child space is quantized, only 15 bits are required as the bit length of the quantized position information to obtain information with the same accuracy. As such, in one object, 12 bits can be reduced.

However, in a case where the position information in the child space is quantized, child space information regarding a position and a size of the child space CA11 is required, and the child space information is 32×6=192 bits in total, for example, when one parameter of a linear function is 32 bits. Furthermore, in a case where the position or the size of the child space does not change in a time direction, it is not necessary to transmit the child space information for every frame.

As such, the more the number of objects included in the child space CA11, the larger the bit length that can be reduced. Therefore, in a case where the number of objects is large, the position information of the objects can be transmitted with a smaller code amount (bit length) in a case of quantizing the position information in the child space than a case of quantizing the position information in the parent space as it is.

<Configuration Example of Encoder>

Subsequently, a more specific embodiment of the present technology described above will be described.

Figure 7:
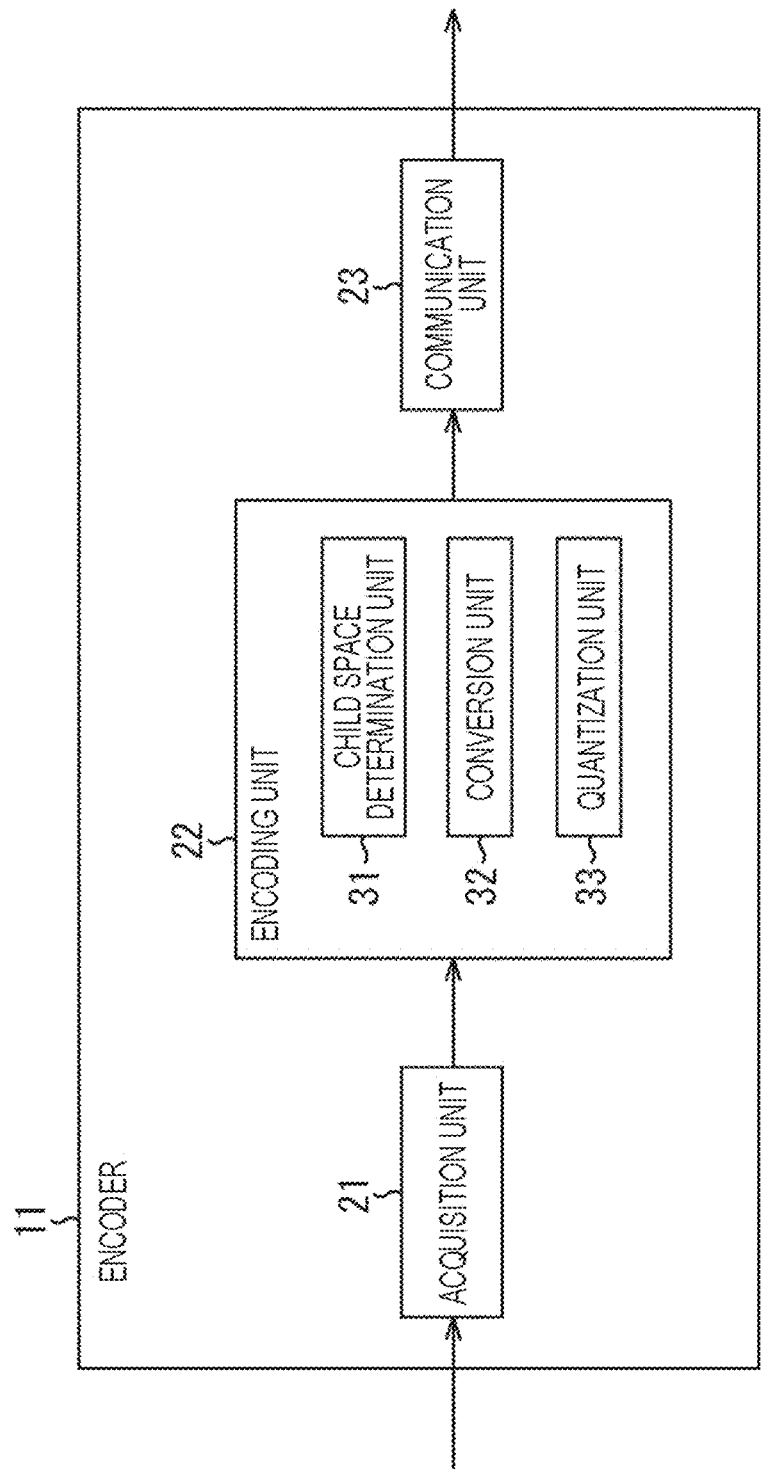
FIG. 7 is a diagram illustrating a configuration example of an encoder.

FIG. 7 is a diagram illustrating a configuration example of an embodiment of an encoder to which the present technology is applied.

An encoder 11 illustrated in FIG. 7 includes an acquisition unit 21, an encoding unit 22, and a communication unit 23.

The acquisition unit 21 acquires the number of objects indicating the number of objects, which are targets to be encoded, an absolute distance absoluteDistance of a parent space, and position information in the parent space of each object from an external device or the like, and supplies the number of objects, the absolute distance absoluteDistance of the parent space, and the position information in the parent space of each object to the encoding unit 22.

The encoding unit 22 encodes the position information in the parent space of each object on the basis of the number of objects, the absolute distance absoluteDistance of the parent space, or the position information in the parent space of the object supplied from the acquisition unit 21, and supplies encoded data obtained as a result of the encoding to the communication unit 23.

The encoding unit 22 includes a child space determination unit 31, a conversion unit 32, and a quantization unit 33.

The child space determination unit 31 determines the child space on the basis of the position information in the parent space of each object. The conversion unit 32 converts the position information in the parent space of each object into position information in the child space on the basis of a determination result of the child space by the child space determination unit 31. The quantization unit 33 quantizes the position information in the child space.

The communication unit 23 transmits the encoded data supplied from the encoding unit 22.

<Description of Encoding Processing by Encoder>

Next, an operation of the encoder 11 will be described. That is, encoding processing by the encoder 11 will hereinafter be described with reference to a flowchart of FIG. 8.

In step S11, the acquisition unit 21 acquires the number of objects, the absolute distance absoluteDistance of the parent space, and the position information in the parent space of each object and supplies the number of objects, the absolute distance absoluteDistance of the parent space, and the position information in the parent space of each object to the encoding unit 22.

In step S12, the child space determination unit 31 determines the child space on the basis of the position information in the parent space of each object supplied from the acquisition unit 21.

For example, in step S12, a cube region (space) that includes all the objects existing in the parent space and has the smallest volume is the child space. Note that, for example, in a case where a distance between a plurality of object groups is a predetermined distance or more, or the like, the child space may be determined for each of the plurality of object groups.

In step S13, the conversion unit 32 converts the position information in the parent space of each object supplied from the acquisition unit 21 into the position information in the child space.

For example, in step S13, the calculation of the abovementioned Equation (1) is performed and the position information in the child space is calculated by the coordinate conversion. Note that the parameters of the linear functions used in the calculation of Equation (1) can be obtained by Equation (2) from the determination result of the child space, that is, the coordinates of the origin O' of the child space in the parent space and the coordinates of the diagonal vertex of the child space with respect to the origin O'.

In step S14, the quantization unit 33 determines the division index.

For example, in step S14, the calculation of the abovementioned Equation (3) is performed on the basis of the predetermined minimum distance MinDist, the determination result of the child space, and the absolute distances absoluteDistanceX, absoluteDistanceY, and absoluteDistanceZ obtained from the absolute distance absoluteDistance, such that the highest accuracy division indices are obtained.

Then, the division index corresponding to required quantization accuracy is determined on the basis of the highest accuracy division indices. Here, the highest accuracy division index may be a division index used for quantization as it is, or a division index having a value smaller than that of the highest accuracy division index may be a division index used for quantization.

Note that the division index can be determined for every axis of the XYZ coordinate system in the child space for each object.

In step S15, the quantization unit 33 obtains the quantization step width by performing calculation similar to that of the abovementioned Equation (4) on the basis of the division index determined in step S14.

In step S16, the quantization unit 33 quantizes the position information in the child space of each object obtained in step S13.

For example, in step S16, the quantization step width obtained in step S15 is used, such that calculation similar to that of the abovementioned Equation (5) is performed and quantization of the coordinates of each axis of the position information in the parent space is performed. That is, quantization is performed for every coordinate component of each axis. Therefore, the quantized position information of each object is obtained.

The processing of the above step S12 to step S16 is performed as processing for encoding the position information in the parent space. Note that it has been described here that the position information in the parent space of all the objects is converted into the position information in the child space and is quantized, but only some of the position information in the parent space may be converted into the position information in the child space and be quantized and the other of the position information in the parent space may be quantized as it is. In such a case, for example, for an object in which a distance to all other objects is a predetermined distance or more and other objects do not exist nearby, the position information in the parent space may be quantized as it is.

In step S17, the encoding unit 22 generates encoded data including the quantized position information obtained in step S16, the number of objects and the absolute distance absoluteDistance acquired in step S11, the child space information obtained from the determination result of the child space in step S12 and information indicating the child space to which each object belongs (hereinafter, also referred to as object belonging information), and the division index determined in step S14.

The encoding unit 22 supplies the obtained encoded data to the communication unit 23.

In step S18, the communication unit 23 transmits the encoded data supplied from the encoding unit 22, and the encoding processing ends.

In such a manner, the encoder 11 converts the position information in the parent space into the position information in the child space by the coordinate conversion, and quantizes the position information in the child space to generate the encoded data. By doing so, a code amount of the quantized position information can be reduced as compared with a case where the position information in the parent space is encoded (quantized) as it is.

<Configuration Example of Decoder>

Furthermore, the encoded data output from the encoder 11 is supplied to a decoder directly or via another device or a recording medium and is decoded by the decoder.

Figure 9:
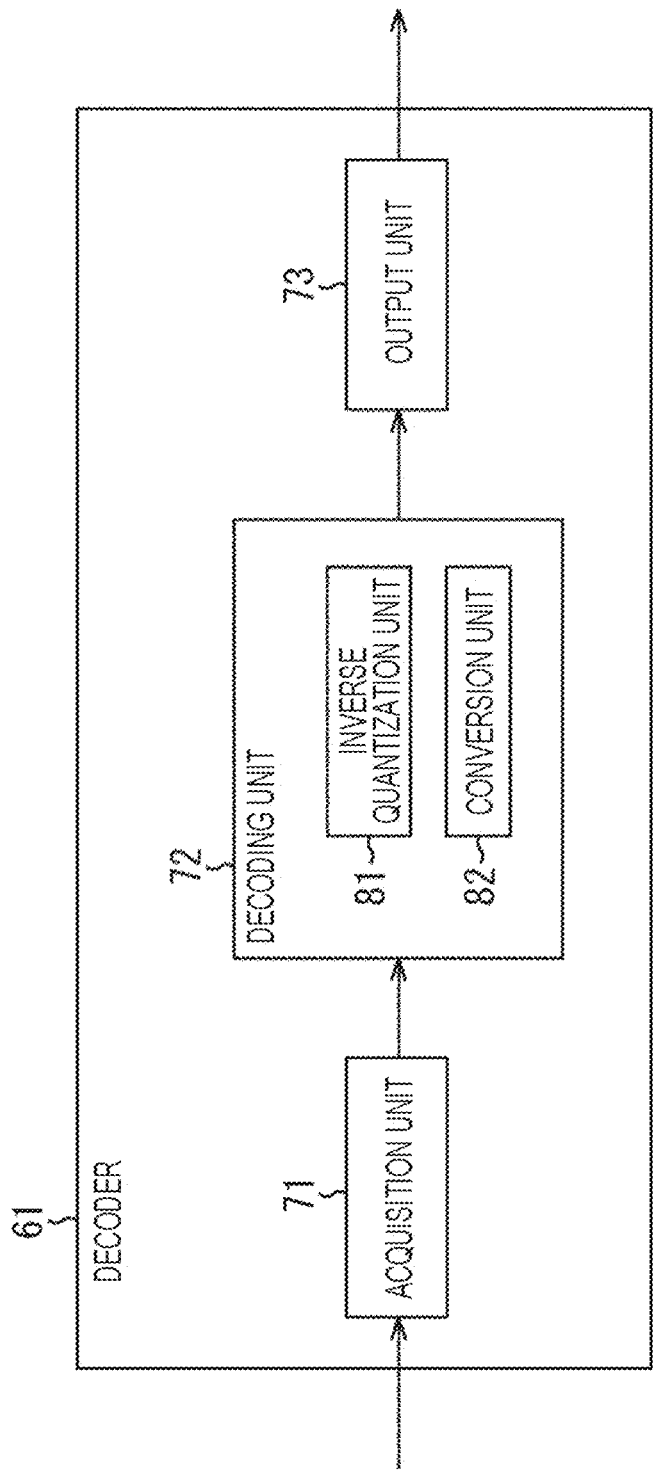
FIG. 9 is a diagram illustrating a configuration example of a decoder.

Here, a decoder decoding the encoded data output by the encoder 11 will be described. FIG. 9 illustrates a configuration example of an embodiment of a decoder to which the present technology is applied.

A decoder 61 illustrated in FIG. 9 includes an acquisition unit 71, a decoding unit 72, and an output unit 73.

The acquisition unit 71 acquires the encoded data by receiving the encoded data transmitted by the encoder 11, acquiring the encoded data from another device, or reading the encoded data from the recording medium, and supplies the encoded data to the decoding unit 72.

The decoding unit 72 unpacks the encoded data supplied from the acquisition unit 71, decodes the quantized position information extracted from the encoded data to obtain the position information in the parent space of each object. The decoding unit 72 includes an inverse quantization unit 81 and a conversion unit 82.

The inverse quantization unit 81 inversely quantizes the quantized position information of each object and calculates the position information in the child space. The conversion unit 82 converts the position information in the child space into the position information in the parent space using the child space information extracted from the encoded data. Moreover, the conversion unit 82 calculates a position of an unnormalized absolute object in the parent space by multiplying the position information in the parent space by the absolute distance absoluteDistance extracted from the encoded data, and supplies position information obtained as a result of the calculation to the output unit 73.

The decoding unit 72 including such an inverse quantization unit 81 and a conversion unit 82 functions as a calculation unit that calculates the position information in the parent space indicating the position of the object in the parent space on the basis of the space information and the quantized position information, which is the quantized position information in the child space.

The output unit 73 outputs the position information indicating the position of the object in the parent space supplied from the decoding unit 72 to the subsequent stage.

<Description of Decoding Processing by Decoder>

Next, an operation of the decoder 61 will be described. That is, decoding processing by the decoder 61 will hereinafter be described with reference to a flowchart of FIG. 10.

In step S41, the acquisition unit 71 acquires the encoded data and supplies the encoded data to the decoding unit 72. The decoding unit 72 unpacks the encoded data supplied from the acquisition unit 71 to extract the quantized position information of each object, the number of objects, the absolute distance absoluteDistance, the child space information, the object belonging information, and the division index.

In step S42, the inverse quantization unit 81 inversely quantizes the quantized position information of each object by calculating the abovementioned Equation (6) on the basis of the quantized position information and the division index. Therefore, the position information in the child space (decoded position information in the child space) is obtained.

In step S43, the conversion unit 82 performs inverse scaling conversion on each object on the basis of the position information in the child space obtained in step S42 and the child space information to convert the position information in the child space into the position information in the parent space.

For example, in step S43, the inverse scaling conversion coefficients are obtained from the parameters of the linear functions as the child space information by the abovementioned Equation (8), and the calculation of Equation (7) is further performed on the basis of the inverse scaling conversion coefficients and the decoded position information in the child space, such that the decoded position information in the parent space is calculated.

When the decoded position information in the parent space of each object is obtained in this manner, the conversion unit 82 obtains the position information indicating the positions of the objects in the parent space by multiplying the decoded position information in the parent space by the absolute distance absoluteDistance, and supplies the position information to the output unit 73.

At this time, the conversion unit 82 also supplies the number of objects or the object belonging information to the output unit 73, if necessary, and the output unit 73 outputs the position information of the object, the number of objects, or the object belonging information supplied from the conversion unit 82 to the subsequent stage.

The processing of the above step S42 and step S43 is processing for decoding the quantized position information to obtain the position information in the parent space. When the position information of the object is output in this manner, the decoding processing ends.

In such a manner, the decoder 61 inversely quantizes the quantized position information and converts the position information in the child space obtained as a result of the inverse quantization into the position information in the parent space. By doing so, a code amount of the information indicating the position of the object can be reduced as compared with a case where the position information in the parent space is encoded (quantized) as it is.

Second Embodiment

<Concerning Distribution of Content>

By the way, the present technology can also be used for arranging contents of a free viewpoint including at least audio data of an audio object. In this case, for example, audio data as a content and position information of an audio object (object) as auxiliary information of the content are transmitted from a server to a client.

In a case where quantized position information indicating a position of the object is transmitted as the auxiliary information of the content from the server to the client as such, the server can hold the abovementioned highest accuracy quantized position information in advance as the quantized position information.

In that case, it becomes possible for the server to generate quantized position information with arbitrary quantization accuracy from the highest accuracy quantized position information according to a condition or the like of a client side, that is, a listener side, and supply the generated quantized position information to the client.

For example, in a case where there is no limitation on a communication speed, the server can transmit the highest accuracy quantized position information with the highest quantization accuracy to the client as it is. On the other hand, for example, in a case where there is a limitation on a communication speed or the like, a transmission bit rate of the quantized position information can be lowered by transmitting quantized position information with quantization accuracy lower than the highest accuracy to the client according to any condition.

The condition mentioned here can be a condition based on, for example, an actual distance from a listener to the object in a parent space, a band situation of a transmission line, or the like.

Specifically, for example, in a human auditory sense, in a horizontal direction, there is a knowledge that an angle within a certain range on the left and right with respect to a front object is recognized as the same angle as a front angle, and this angle is called a perception limit angle.

Therefore, if a condition that a quantization step width is smaller than a distance in the horizontal direction corresponding to the perception limit angle at a certain position of the object viewed from the listener is satisfied, even though quantized position information with any quantization accuracy is acquired, in a case where a sound is localized at a position of the object obtained from the quantized position information, the listener does not feel a deviation of a sound image position. In other words, if the quantized position information has a quantization step width equal to or less than a tolerance due to the perception limit angle, the listener will not feel the deviation of the sound image position.

Therefore, for example, if quantized position information quantized with the largest quantization step width that does not exceed the distance in the horizontal direction corresponding to the perception limit angle is selected on the basis of the actual distance from the listener to the object and the perception limit angle, a code amount of the quantized position information can be reduced and a transmission bit rate can be reduced without causing the listener to feel the deviation of the sound image position.

Furthermore, for example, quantized position information with quantization accuracy according to a band state of a transmission line transmitting the quantized position information may be acquired. In this case, for example, when there is a margin in a transmission band of the transmission line, it is only required to acquire the highest accuracy quantized position information, and when a transmission band of the transmission line is narrow, it is only required to acquire quantized position information with lower quantization accuracy, which is determined for the transmission bandwidth.

Furthermore, it is necessary to transmit information necessary for decoding by the client, such as the number of objects, an absolute distance absoluteDistance, or the like, from the server to the client for every frame or the like of the audio data.

Figures 10, 11:
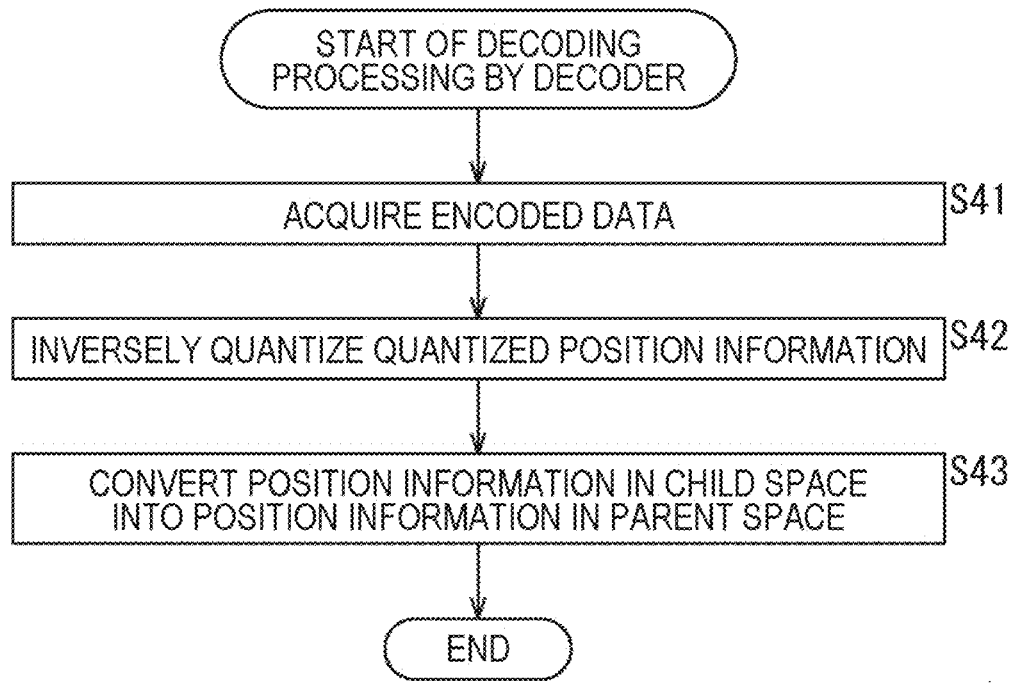
FIG. 10 is a flowchart for describing decoding processing.
FIG. 11 is a diagram illustrating an example of header information.

Therefore, it is only required to transmit the necessary information such as the number of objects, the absolute distance absoluteDistance, or the like, by transmitting, for example, header information illustrated in FIG. 11 from the server to the client.

In an example illustrated in FIG. 11, the header information includes an absolute distance absoluteDistance indicating a size of the parent space indicated by a character "absoluteDistance", child space information indicated by a character "ChildAreaInfo( )", and the number of objects that are in the parent space indicated by a character "nobjs".

Furthermore, in the header information, indices indicating the child space to which the objects belong are stored as object belonging information by the number corresponding to the number of objects, that is, for each object. Here, a character "ChildAreaIndexForObj[i]" indicates object belonging information of an i-th object.

Moreover, a format of the child space information "ChildAreaInfo( )" part included in the header information is as illustrated in FIG. 12, for example.

In an example illustrated in FIG. 12, the child space information includes the number of child spaces indicating the number of child spaces included in the parent space, which is indicated by a character "numOfChildArea".

Furthermore, in the child space information, the highest accuracy division indices in each axis direction and parameters of linear functions are stored by the number corresponding to the number of child spaces.

That is, characters "max_exp_index_X[i]", "max_exp_index_Y[i]", and "max_exp_index_Z[i]" indicate the highest accuracy division indices in each of an X-axis direction, a Y-axis direction, and a Z-axis direction for an i-th child space, respectively.

Furthermore, characters "a_x[i]", "a_y[i]", and "a_z[i]" are parameters indicating inclinations of the linear functions in each of the X-axis direction, the Y-axis direction, and the Z-axis direction for the i-th child space, respectively. Moreover, characters "b_x[i]", "b_y[i]", and "b_z[i]" are parameters indicating intercepts of the linear functions in each of the X-axis direction, the Y-axis direction, and the Z-axis direction for the i-th child space, respectively. These inclinations and intercepts of the linear functions are the scaling conversion coefficients illustrated in the abovementioned Equation (2).

Note that the header information may be transmitted to the client for every frame or may be transmitted in a case where a change in the number, positions, or sizes of child spaces occurs. In addition, the header information may be transmitted at constant frame intervals.

Furthermore, in a case where an object moves out of the child space to which it belongs, it is only required to update the object belonging information so that the object belongs to another existing child space or a new child space. In this case, the header information including the updated object belonging information is transmitted from the server to the client.

Moreover, if the highest accuracy quantized position information is held in the server as described above, the client can acquire quantized position information with arbitrary quantization accuracy from the server.

For example, even after the client has acquired quantized position information with predetermined quantization accuracy, it is possible to obtain quantized position information with quantization accuracy higher than that of the already acquired quantized position information.

Specifically, first, quantized position information that the client initially acquires from the server is referred to as initial quantized position information.

Note that the initial quantized position information is quantized position information with quantization accuracy less than or equal to the highest accuracy corresponding to the highest accuracy division index included in the header information. Therefore, it is also possible to acquire the highest accuracy quantized position information as the initial quantized position information.

The client acquires the initial quantized position information from the server by transmitting, for example, an initial quantized position information transmission request of a bit stream format illustrated in FIG. 13 to the server.

In an example illustrated in FIG. 13, in the initial quantized position information transmission request, a division index corresponding to quantization accuracy with which transmission is requested is stored in each axis direction for every object.

That is, characters "exp_index_initial_x[i]", "exp_index_initial_y[i]", and "exp_index_initial_z[i]" indicate division indices in each of the X-axis direction, the Y-axis direction, and the Z-axis direction for an i-th object, respectively.

The server that has received such an initial quantized position information transmission request transmits quantized position information with quantization accuracy corresponding to the division indices included in the initial quantized position information transmission request for each axis direction as the initial quantized position information to the client for every object.

For example, in an example illustrated in FIG. 5, in a case where the division index included in the initial quantized position information transmission request is "3", quantized position information "001" corresponding to a division index "3" is transmitted as the initial quantized position information to the client.

Specifically, the initial quantized position information is transmitted from the server to the client in a bit stream format illustrated in FIG. 14, for example.

In an example illustrated in FIG. 14, in the bit stream, the initial quantized position information is stored for each axis direction for every object.

Here, characters "Xpos_initial[i]", "Ypos_initial[i]", and "Zpos_initial[i]" indicate initial quantized position information in each of the X-axis direction, the Y-axis direction, and the Z-axis direction for the i-th object, more specifically, coordinate values of components in each axis direction configuring the initial quantized position information, respectively.

In the client, in a case where it is desired to further obtain quantized position information with quantization accuracy higher than that of the initial quantized position information after acquiring the initial quantized position information in this manner, additional bit information, which is difference information between the quantized position information and the initial quantized position information, is acquired.

In the client, by adding the additional bit information to a lower bit side of the initial quantized position information, the quantized position information with the quantization accuracy higher than that of the initial quantized position information is obtained.

Specifically, for example, in the example illustrated in FIG. 5, it is assumed that the quantized position information "001" corresponding to the division index "3" has been acquired as the initial quantized position information, but it has been desired to finally obtain quantized position information "00110" corresponding to a division index "5".

In this case, the client acquires "10", which is difference information between the initial quantized position information "001" and the quantized position information "00110" desired to be finally obtained, as the additional bit information. Then, the client can obtain the quantized position information "00110" with the quantization accuracy desired to be finally obtained by adding the newly acquired additional bit information "10" to a lower bit side of the already acquired initial quantized position information "001".

In a case where the client acquires the additional bit information from the server as such, the client selects a request mode at the time of acquiring the additional bit information according to a situation or the like of the transmission band. Then, the client transmits an additional bit information transmission request for requesting the server to transmit the additional bit information to the server, in a format according to the selected request mode.

Here, for example, additional bit information transmission request illustrated in FIG. 15 is transmitted to the server.

In an example illustrated in FIG. 15, the additional bit information transmission request includes information indicating a request mode indicated by a character "request_mode". For example, there are three request modes: common mode, child space common mode, and individual mode.

The common mode is a mode for requesting additional bit information for each axis direction of all the objects so that a bit length of additional bit information additionally acquired for every axis direction are the same as each other in all the objects. For example, in the common mode, a bit length to be added for every axis direction, that is, quantization accuracy to be additionally increased can be selected.

Furthermore, the child space common mode is a mode for requesting additional bit information for each axis direction of all the objects belonging to the child space for one or more desired child spaces so that a bit length of additional bit information to be additionally acquired for every axis direction are the same as each other in all the objects belonging to the same child space. For example, even in the child space common mode, the bit length to be added for every axis direction can be selected. Note that in the child space common mode, there are a child space that requests the additional bit information and a child space that does not request the additional bit information.

Moreover, the individual mode is a mode for individually requesting additional bit information for every object. In the individual mode, it can be selected whether or not to request the additional bit information for every object, and the additional bit information can be requested so that quantized position information with desired quantization accuracy is obtained for every axis direction for each object.

In FIG. 15, for example, in a case where the request mode indicated by the character "request_mode" indicates the common mode, as shown in a part of a character "case 0", in the additional bit information transmission request, information indicated by characters "addbit_x", "addbit_y", and "addbit_z" and indicating an additional bit length in each of the X-axis direction, the Y-axis direction, and the Z-axis direction is stored.

For example, if the information indicating the additional bit length is information indicating 3 bits, additional bit information of 3 bits added to the initial quantized position information is transmitted as the additional bit information.

Furthermore, in a case where the request mode indicated by the character "request_mode" indicates the child space common mode, as shown in a part of a character "case 1", in the additional bit information transmission request, information indicated by a character "num_of_addprec_childArea" and indicating the number of child spaces that request the additional bit information is stored.

In this case, further, in the additional bit information transmission request, indices indicated by a character "addprec_childArea_index[i]" and indicating the child spaces that request the additional bit information and "addbit_x[i]", "addbit_y[i]", and "addbit_z[i]" indicating the additional bit lengths in each axis direction in the child spaces are stored by the number of the child spaces that request the additional bit information. In particular, here, characters "addbit_x[i]", "addbit_y[i]", and "addbit_z[i]" are information indicating the additional bit lengths in each of the X-axis direction, the Y-axis direction, and the Z-axis direction, respectively.

Moreover, in a case where the request mode indicated by the character "request_mode" indicates the individual mode, as shown in a part of a character "case 2", in the additional bit information transmission request, information indicated by a character "num_of_addprec_objects" and indicating the number of objects that request the additional bit information is stored.

In this case, further, in the additional bit information transmission request, indices indicated by a character "addprec_object_index[i]" and indicating the objects that request the additional bit information and "addbit_x[i]", "addbit_y[i]", and "addbit_z[i]" indicating the additional bit lengths in each axis direction of the objects are stored by the number of objects that request the additional bit information. In particular, here, characters "addbit_x[i]", "addbit_y[i]", and "addbit_z[i]" are information indicating the additional bit lengths in each of the X-axis direction, the Y-axis direction, and the Z-axis direction, respectively.

When the server receives such an additional bit information transmission request illustrated in FIG. 15, the server transmits the additional bit information to the client in a bit stream format illustrated in FIG. 16, for example.

In an example illustrated in FIG. 16, in a case where the request mode is the common mode, as shown in a part of a character "case 0", in a bit stream, additional bit information in each of the X-axis direction, the Y-axis direction, and the Z-axis direction for the i-th object indicated by characters "Xpos_add[i]", "Ypos_add[i]", and "Zpos_add[i]" is stored.

Furthermore, in a case where the request mode is the child space common mode, as shown in a part of a character "case 1", in a bit stream, additional bit information of each object belonging the child space is stored for every child space in which the additional bit information is requested. Specifically, additional bit information in each of the X-axis direction, the Y-axis direction, and the Z-axis direction for a j-th object in the child space indicated by characters "Xpos_add[j]", "Ypos_add[j]", and "Zpos_add[j]" is stored.

Moreover, in a case where the request mode is the individual mode, as shown in a part of a character "case 2", in a bit stream, additional bit information of the object is stored for every object in which the additional bit information is requested. Specifically, additional bit information in each of the X-axis direction, the Y-axis direction, and the Z-axis direction for the object indicated by characters Xpos_add[addprec_object_index[i]]", "Ypos_add[addprec_object_index[i]]", and "Zpos_add[addprec_object_index[i]]" is stored.

By making it possible to acquire the additional bit information as such, it becomes possible to obtain quantized position information with sufficient quantization accuracy with a transmission amount smaller than that in a case of acquiring the highest accuracy quantized position information from the beginning.

<Configuration Example of Content Reproduction System>

Next, a content reproduction system in which the client acquires the content or the quantized position information from the server and reproduces the content, as described above, will be described.

Figure 17:
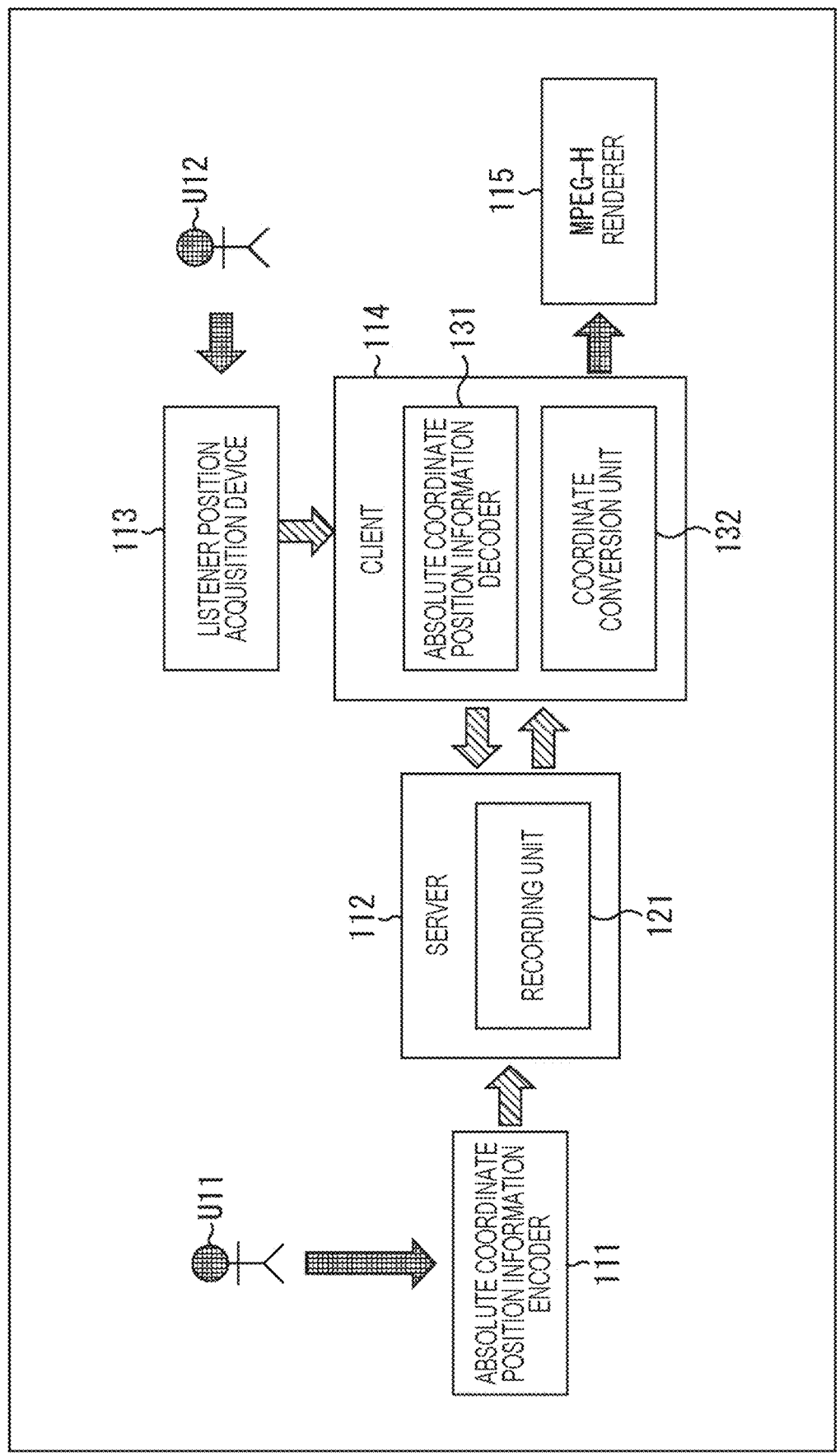
FIG. 17 is a diagram illustrating a configuration example of a content reproduction system.

Such a content reproduction system is configured, for example, as illustrated in FIG. 17.

The content reproduction system illustrated in FIG. 17 includes an absolute coordinate position information encoder 111, a server 112, a listener position acquisition device 113, a client 114, and an MPEG-H renderer 115. In this content reproduction system, the client 114 calculates polar coordinate position information of a polar coordinate representation indicating a position of an object viewed from a listener U12.

That is, on a distribution side of the content, a user U11 inputs position information in a parent space, or the like, indicating a position of each object in the parent space to the absolute coordinate position information encoder 111.

This position information in the parent space is absolute coordinate information represented by the coordinates of the three-dimensional absolute coordinate system (orthogonal coordinate system), that is, the xyz coordinate system, as described above.

The absolute coordinate position information encoder 111 encodes the position information in the parent space input by the user U11, and transmits an encoded data file obtained as a result of the encoding to the server 112.

The server 112 is an information processing device including a recording unit 121, and records the encoded data file received from the absolute coordinate position information encoder 111 in the recording unit 121. Here, the encoded data file includes the highest accuracy quantized position information of each object.

The server 112 generates initial quantized position information or additional bit information from the highest accuracy quantized position information recorded in the recording unit 121, and transmits the initial quantized position information or the additional bit information to the client 114.

On a client 114 side, the listener position acquisition device 113 acquires listener position information indicating a position of the listener U12 in the parent space and supplies the listener position information to the client 114. The listener position acquisition device 113 includes, for example, a distance measuring device such as a global positioning system (GPS) and a gyro sensor, an input device that acquires virtual position information of the listener U12 in a virtual space as the parent space, and the like.

The client 114 is an information processing device including an absolute coordinate position information decoder 131 and a coordinate conversion unit 132, and acquires the initial quantized position information or the additional bit information from the server 112.

The absolute coordinate position information decoder 131 decodes the initial quantized position information acquired from the server 112 or the quantized position information obtained from the initial quantized position information and the additional bit information.

The coordinate conversion unit 132 converts information indicating a position of the object in the parent space obtained by decoding the quantized position information into polar coordinates indicating a relative position of the object viewed from the listener U12 in the parent space, and takes the converted polar coordinates as polar coordinate position information.

The coordinate conversion unit 132 supplies the polar coordinate position information of each object to the MPEG-H renderer 115, and the MPEG-H renderer 115 performs rendering on the basis of the supplied polar coordinate position information and audio data of each object acquired from the server 112.

Then, the MPEG-H renderer 115 outputs reproduced audio data which is obtained by the rendering and in which a sound image of the object is localized at each position in the parent space, to a reproduction system such as a speaker or the like to reproduce a sound. Note that the MPEG-H renderer 115 is a renderer of a polar coordinate system standardized by MPEG-H.

In the content reproduction system described above, the information indicating the position of the object exchanged between the server 112 and the client 114 is the quantized position information, which is an absolute coordinate. Therefore, there is an advantage that it is not necessary to consider the position of the listener U12 in the parent space and it is only required to transmit the quantized position information to the client 114 only for a moving object.

<Configuration Example of Absolute Coordinate Position Information Encoder>

Next, a more detailed configuration example of the absolute coordinate position information encoder 111, the server 112, and the client 114 illustrated in FIG. 17 will be described.

First, a configuration example of the absolute coordinate position information encoder 111 will be described.

Figure 18:
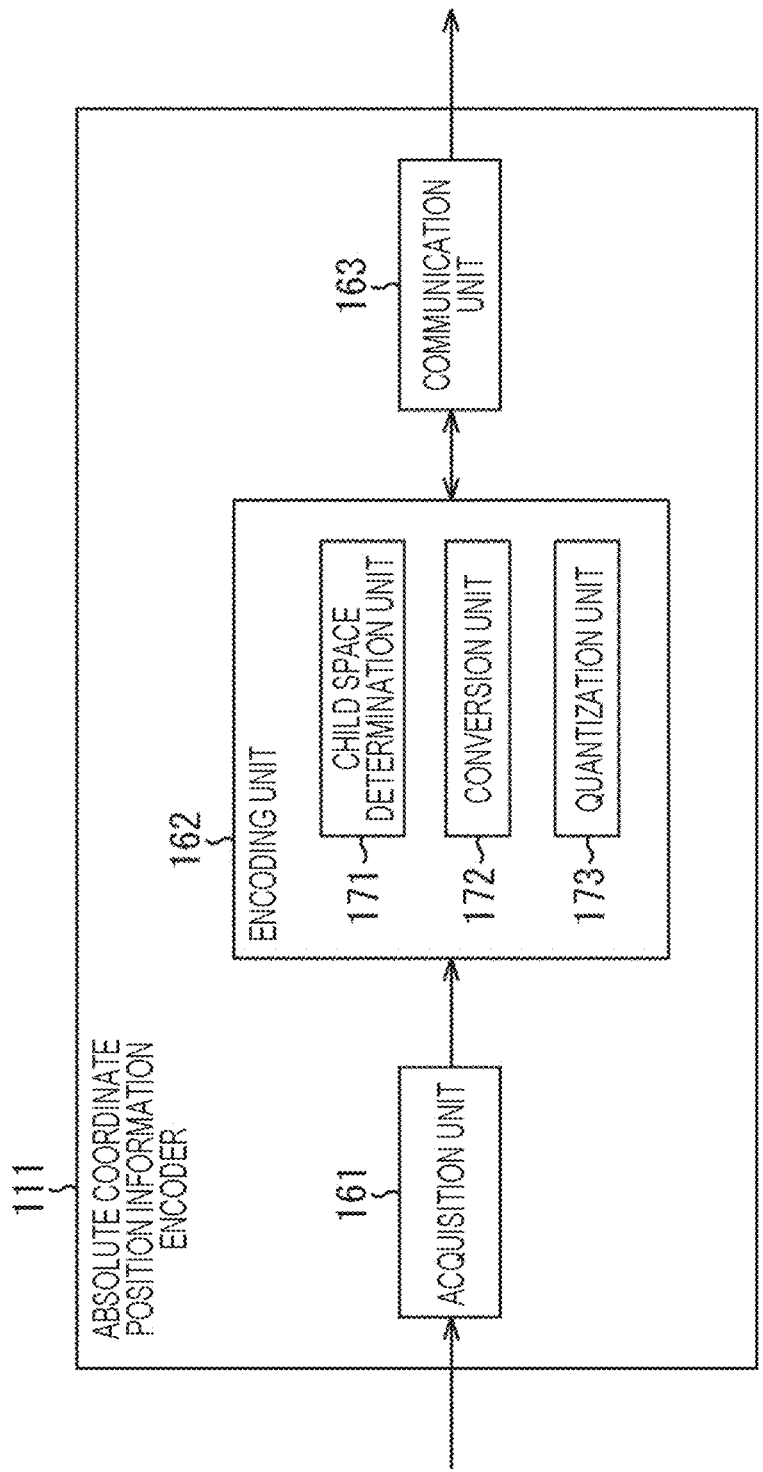
FIG. 18 is a diagram illustrating a configuration example of an absolute coordinate position information encoder.

The absolute coordinate position information encoder 111 is configured as illustrated in FIG. 18, for example.

The absolute coordinate position information encoder 111 illustrated in FIG. 18 includes an acquisition unit 161, an encoding unit 162, and a communication unit 163.

The acquisition unit 161 acquires the number of objects of objects, which are targets to be encoded, an absolute distance absoluteDistance of a parent space, and position information in the parent space of each object from an external device or the like, and supplies the number of objects, the absolute distance absoluteDistance of the parent space, and the position information in the parent space of each object to the encoding unit 162.

The encoding unit 162 encodes the position information in the parent space of each object on the basis of the number of objects, the absolute distance absoluteDistance of the parent space, or the position information in the parent space of the object supplied from the acquisition unit 161, and supplies an encoded data file obtained as a result of the encoding to the communication unit 163.

The encoding unit 162 includes a child space determination unit 171, a conversion unit 172, and a quantization unit 173. Note that the child space determination unit 171 to the quantization unit 173 correspond to the child space determination unit 31 to the quantization unit 33 illustrated in FIG. 7 and perform the same operations as those of the child space determination unit 31 to the quantization unit 33, and a description thereof will thus be omitted.

The communication unit 163 transmits the encoded data file supplied from the encoding unit 162.

<Configuration Example of Server>

Figure 19:
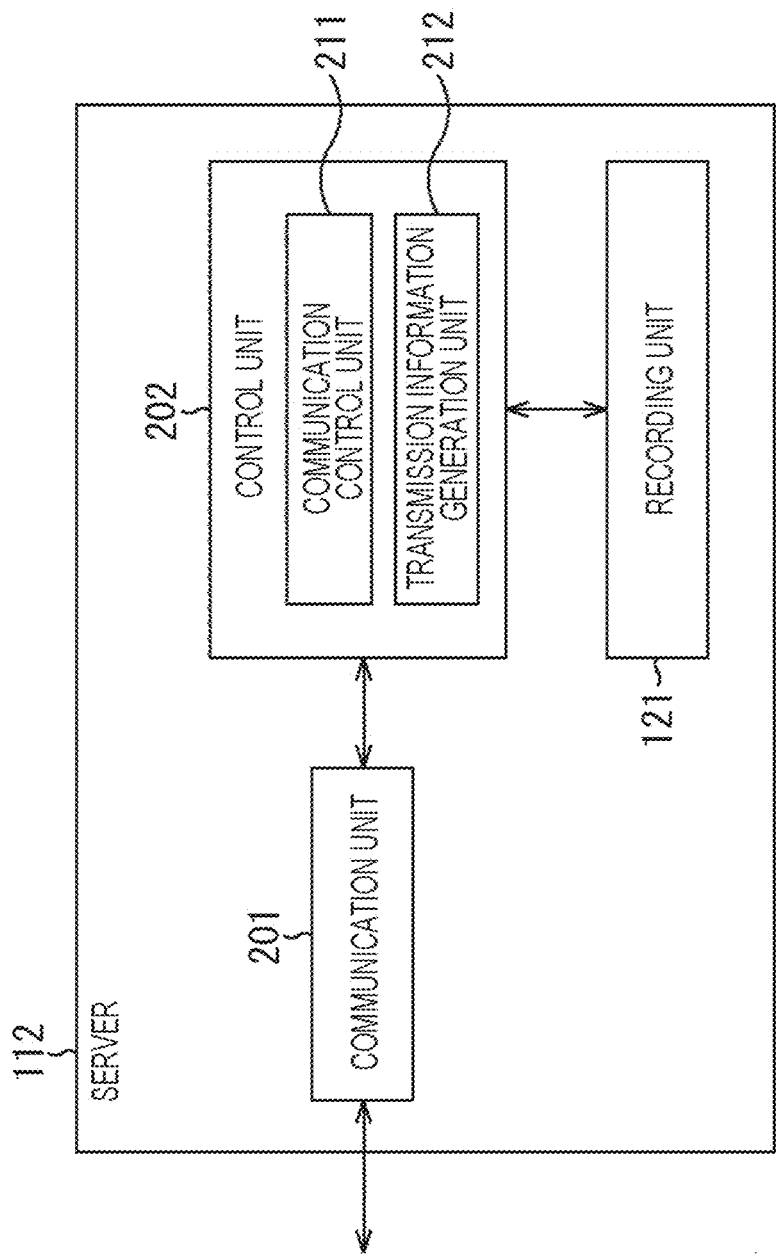
FIG. 19 is a diagram illustrating a configuration example of a server.

Furthermore, the server 112 is configured as illustrated in FIG. 19, for example. Note that in FIG. 19, portions corresponding to those in FIG. 17 will be denoted by the same reference numerals, and a description thereof will be appropriately omitted.

The server 112 illustrated in FIG. 19 includes a communication unit 201, a control unit 202, and the recording unit 121.

The communication unit 201 transmits various information supplied from the control unit 202 to the client 114 or receives various information transmitted from the absolute coordinate position information encoder 111 or the client 114 and supplies the various information to the control unit 202.

The control unit 202 controls an entire operation of the server 112. The control unit 202 includes a communication control unit 211 and a transmission information generation unit 212.

The communication control unit 211 controls communication with the absolute coordinate position information encoder 111 or the client 114 by the communication unit 201 by controlling the communication unit 201. The transmission information generation unit 212 generates various information to be transmitted to the client 114 using information such as the encoded data file or the like recorded in the recording unit 121, if necessary.

<Configuration Example of Client>

Figure 20:
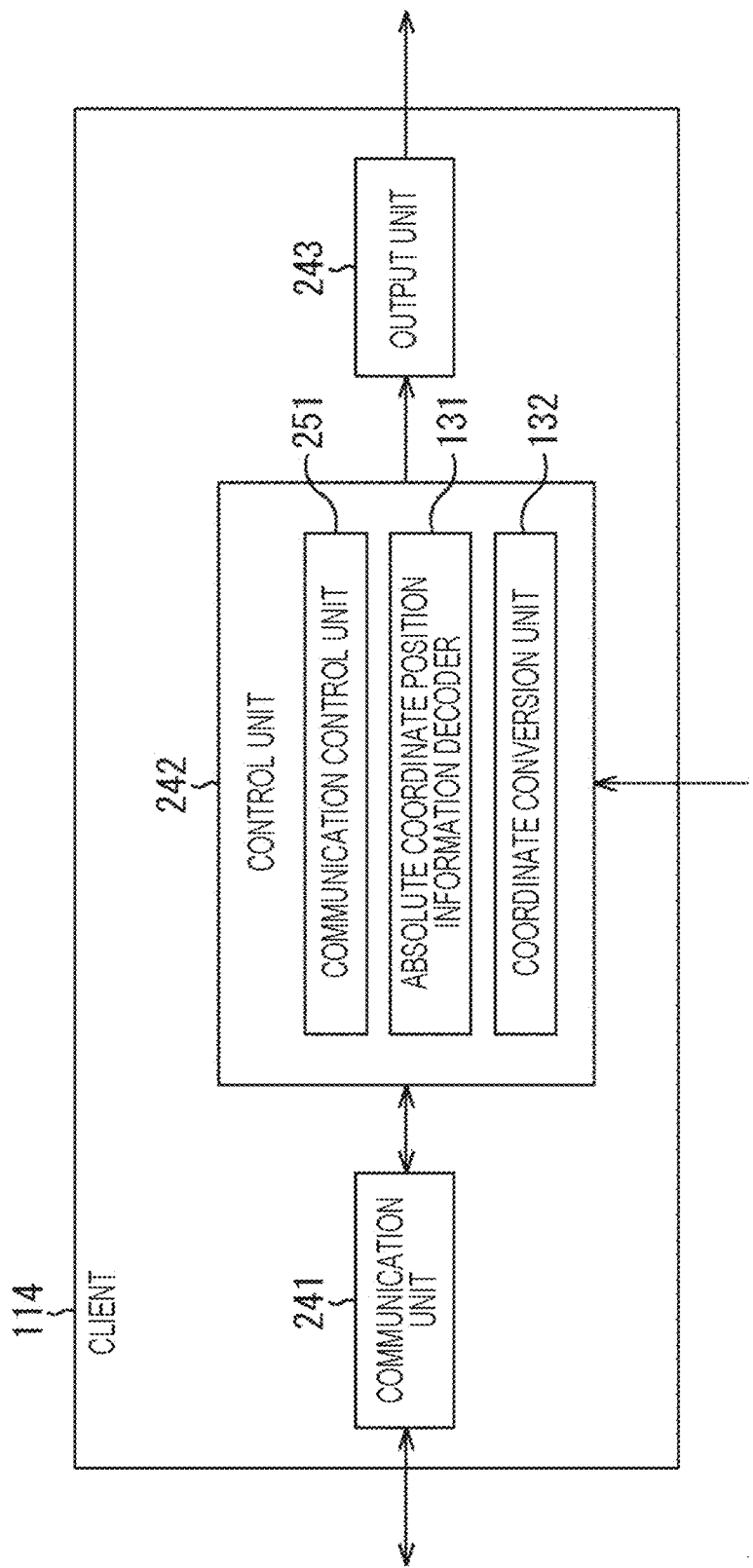
FIG. 20 is a diagram illustrating a configuration example of a client.

Furthermore, the client 114 is configured as illustrated in FIG. 20, for example. Note that in FIG. 20, portions corresponding to those in FIG. 17 will be denoted by the same reference numerals, and a description thereof will be appropriately omitted.

The client 114 illustrated in FIG. 20 includes a communication unit 241, a control unit 242, and an output unit 243.

The communication unit 241 transmits various information supplied from the control unit 242 to the server 112 or receives various information transmitted from the server 112 and supplies the various information to the control unit 242.

The control unit 242 controls an entire operation of the client 114. The control unit 242 includes a communication control unit 251, the absolute coordinate position information decoder 131, and the coordinate conversion unit 132.

The communication control unit 251 controls communication with the server 112 by the communication unit 241 by controlling the communication unit 241. For example, the communication control unit 251 functions as an acquisition unit that acquires the initial quantized position information or the additional bit information from the server 112 by controlling the communication unit 241.

The absolute coordinate position information decoder 131 functions as a calculation unit that performs decoding of the encoded position information in the parent space by calculating position information in the parent space indicating an absolute position of the object in the parent space on the basis of the quantized position information and the additional bit information.

The output unit 243 outputs the polar coordinate position information of each object obtained by the coordinate conversion by the coordinate conversion unit 132 to the MPEG-H renderer 115.

<Description of Encoding Processing and File Storage Processing>

Next, specific processing performed in the content reproduction system will be described.

Figure 21:
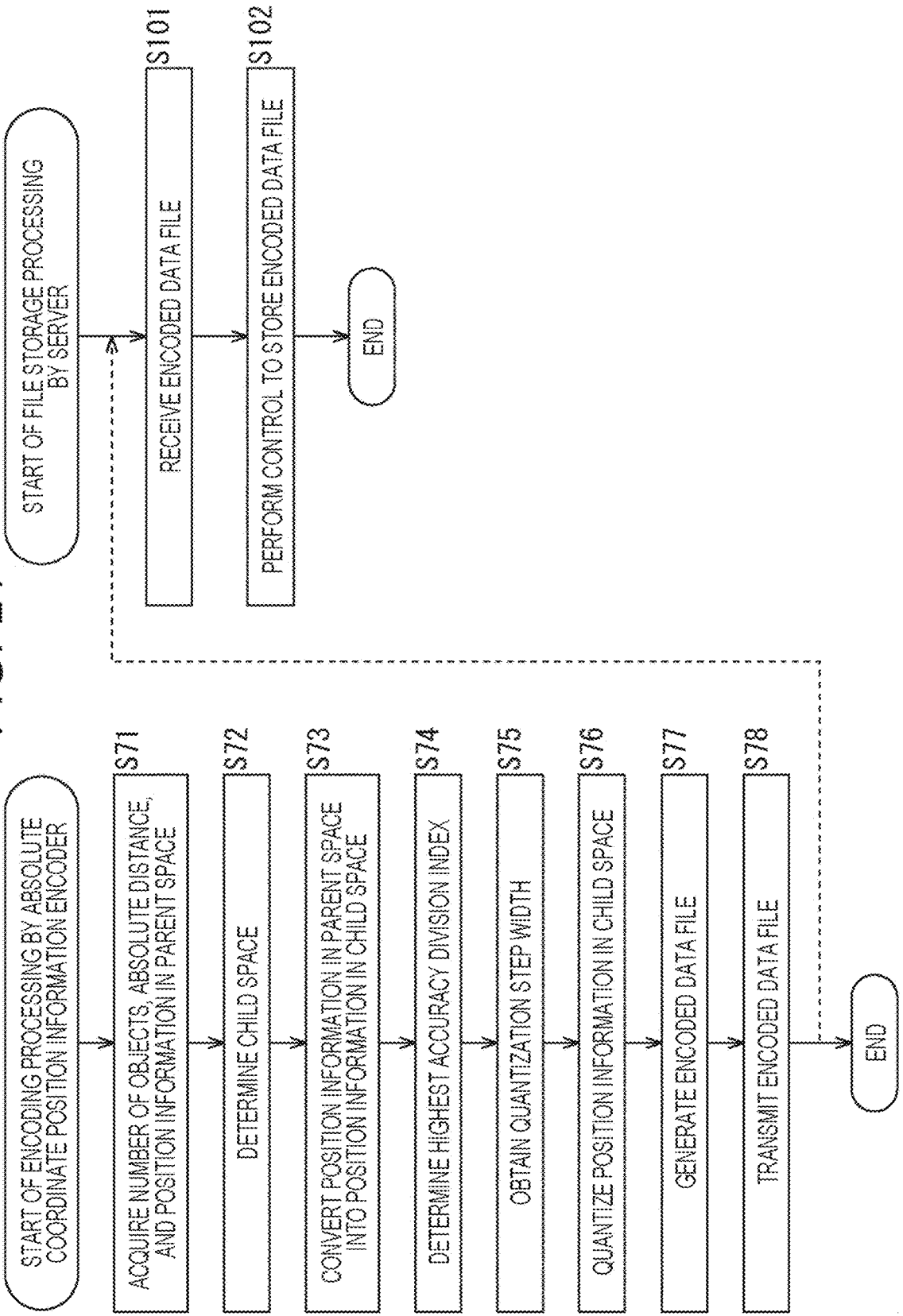
FIG. 21 is a flowchart for describing encoding processing and file storage processing.

First, encoding processing by the absolute coordinate position information encoder 111 and file storage processing by the server 112 will be described with reference to a flowchart of FIG. 21.

When the encoding processing starts by the absolute coordinate position information encoder 111, the acquisition unit 161 acquires the number of objects input by the user U11, the absolute distance absoluteDistance of the parent space, and the position information in the parent space of each object and supplies the number of objects, the absolute distance absoluteDistance of the parent space, and the position information in the parent space of each object to the encoding unit 162, in step S71.

Figure 8:
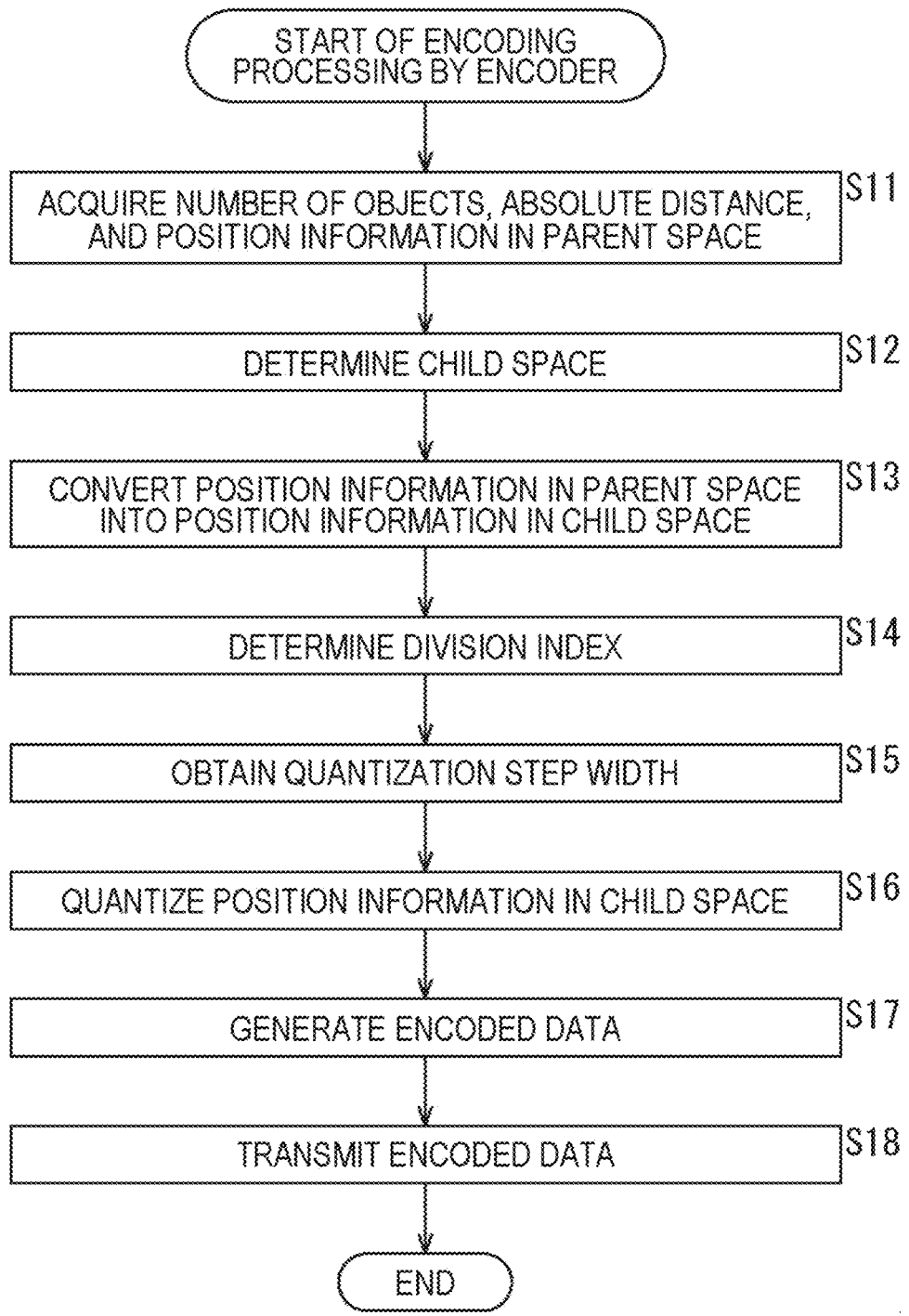
FIG. 8 is a flowchart for describing encoding processing.

In step S72, the child space determination unit 171 determines the child space on the basis of the position information in the parent space of each object supplied from the acquisition unit 161. In step S72, processing similar to that of step S12 of FIG. 8 is performed, such that the child space is determined.

In step S73, the conversion unit 172 converts the position information in the parent space of each object supplied from the acquisition unit 161 into the position information in the child space. In step S73, processing similar to that of step S13 of FIG. 8 is performed.

In step S74, the quantization unit 173 determines the highest accuracy division index.

For example, in step S74, the calculation of the abovementioned Equation (3) is performed on the basis of the predetermined minimum distance MinDist, the determination result of the child space, and the absolute distances absoluteDistanceX, absoluteDistanceY, and absoluteDistanceZ obtained from the absolute distance absoluteDistance, such that the highest accuracy division indices are obtained.

In step S75, the quantization unit 173 obtains the quantization step width by performing the calculation of the abovementioned Equation (4) on the basis of the highest accuracy division index determined in step S74.

In step S76, the quantization unit 173 quantizes the position information in the child space of each object obtained in step S73.

For example, in step S76, the quantization step width obtained in step S75 is used, such that the calculation of the abovementioned Equation (5) is performed, quantization of the coordinates of each axis direction of the position information in the parent space is performed, and the highest accuracy quantized position information of each object is obtained.

By the processing of the above step S72 to step S76, the position information in the parent space is encoded.

In step S77, the encoding unit 162 generates the encoded data file including the highest accuracy quantized position information, the number of objects and the absolute distance absoluteDistance acquired in step S71, and the child space information and the object belonging information obtained from the determination result of the child space in step S72, and supplies the encoded data file to the communication unit 163.

Here, for example, the child space information includes information indicating the number of child spaces included in the parent space, the highest accuracy division indices in each child space, and parameters of linear functions for coordinate conversion for each child space.

In step S78, the communication unit 163 transmits the encoded data file supplied from the encoding unit 162 to the server 112 by wireless or wired communication or the like, and the encoding processing ends.

Note that when the encoded data file is correctly stored in the server 112 as described later, a storage completion notification indicating that the encoded data file has been correctly stored in the server 112 is transmitted from the server 112, and thus, the absolute coordinate position information encoder 111 receives the transmitted storage completion notification and appropriately displays the storage completion notification.

Furthermore, when the encoded data file is transmitted, the file storage processing starts in the server 112.

That is, in step S101, the communication unit 201 of the server 112 receives the encoded data file transmitted from the absolute coordinate position information encoder 111 under the control of the communication control unit 211, and supplies the encoded data file to the control unit 202.

In step S102, the control unit 202 supplies the encoded data file supplied from the communication unit 201 to the recording unit 121 and performs control to store the encoded data file. Therefore, the highest accuracy quantized position information and the like are stored (recorded) in the recording unit 121.

Thereafter, the communication control unit 211 controls the communication unit 201 to transmit a storage completion notification indicating that the encoded data file has been correctly stored to the absolute coordinate position information encoder 111, and the file storage processing ends.

In such a manner, the absolute coordinate position information encoder 111 converts the position information in the parent space into the position information in the child space by the coordinate conversion, and quantizes the position information in the child space to generate the encoded data file. By doing so, a code amount of the quantized position information can be reduced as compared with a case where the position information in the parent space is encoded (quantized) as it is.

Furthermore, the server 112 receives and stores the encoded data file transmitted from the absolute coordinate position information encoder 111. Therefore, it becomes possible to generate quantized position information with arbitrary quantization accuracy from the highest accuracy quantized position information according to a request of the client 114 and transmit the generated quantized position information to the client 114.

As a result, by causing the client 114 to obtain the polar coordinate position information of each object, it is possible to reduce a processing load on the distribution side of the content such as the server 112 or the absolute coordinate position information encoder 111 and reduce a transmission amount of information.

<Description of Position Information Acquisition Processing and Position Information Transmission Processing>

When the encoded data file is stored in the server 112, the client 114 can receive the quantized position information of each object for the content from the server 112.

Hereinafter, processing performed when the client 114 acquires the initial quantized position information from the server 112 will be described. That is, position information acquisition processing by the client 114 and position information transmission processing by the server 112 will hereinafter be described with reference to a flowchart of FIG. 22.

When the position information acquisition processing starts by the client 114, the communication unit 241 transmits a header information transmission request to the server 112 under the control of the communication control unit 251, in step S131.

When the header information transmission request is transmitted, the position information transmission processing starts in the server 112. That is, in step S161, the communication unit 201 receives the header information transmission request transmitted from the client 114 under the control of the communication control unit 211, and supplies the header information transmission request to the control unit 202.

Then, the transmission information generation unit 212 generates header information including the absolute distance absoluteDistance, the child space information, the number of objects, and the object belonging information with reference to the encoded data file recorded in the recording unit 121. Therefore, for example, the header information illustrated in FIG. 11 is generated.

When the transmission information generation unit 212 generates the header information, the communication control unit 211 supplies the generated header information to the communication unit 201.

In step S162, the communication unit 201 transmits the header information supplied from the communication control unit 211 to the client 114 under the control of the communication control unit 211.

In this case, in the client 114, in step S132, the communication unit 241 receives the header information transmitted from the server 112 under the control of the communication control unit 251, and supplies the header information to the control unit 242.

When the header information is obtained in this manner, the control unit 242 determines quantization accuracy, that is, a division index, of the initial quantized position information on the basis of a situation of a transmission band with the server 112, the number of objects included in the header information, the highest accuracy division index, or the like.

Then, the control unit 242 generates an initial quantized position information transmission request for requesting transmission of the initial quantized position information on the basis of the determined quantization accuracy, and supplies the initial quantized position information transmission request to the communication unit 241. For example, here, the initial quantized position information transmission request illustrated in FIG. 13 is generated.

In step S133, the communication unit 241 transmits the initial quantized position information transmission request supplied from the control unit 242 to the server 112 under the control of the communication control unit 251.

Then, in the server 112, in step S163, the communication unit 201 receives the initial quantized position information transmission request transmitted from the client 114 under the control of the communication control unit 211, and supplies the initial quantized position information transmission request to the control unit 202.

In step S164, the transmission information generation unit 212 generates initial quantized position information with reference to the encoded data file recorded in the recording unit 121 according to the initial quantized position information transmission request supplied from the communication unit 201.

For example, in the example of FIG. 5, in a case where a division index requested by the initial quantized position information transmission request is "9", the transmission information generation unit 212 extracts upper 9 bits of the highest accuracy quantized position information included in the encoded data file and uses the extracted upper 9 bits as the initial quantized position information.

In the example of FIG. 5, "001100110" obtained by extracting the same bit length as a division index "9", that is, only 9 bits from a coordinate value "00110011001" in a predetermined axis direction of the highest accuracy quantized position information from the most significant bit side is a coordinate value in the predetermined axis direction of the initial quantized position information.

Note that in a case where the highest accuracy division index is requested by the initial quantized position information transmission request, the highest accuracy quantized position information is the initial quantized position information as it is.

When the transmission information generation unit 212 generates the initial quantized position information for every object, the transmission information generation unit 212 stores the initial quantized position information in the bit stream in the format illustrated in FIG. 14, and the communication control unit 211 supplies the generated bit stream to the communication unit 201.

In step S165, the communication unit 201 transmits the bit stream supplied from the communication control unit 211, that is, the initial quantized position information of each object to the client 114 under the control of the communication control unit 211, and the position information transmission processing ends.

When the initial quantized position information is transmitted by the server 112, processing of step S134 is performed in the client 114.

In step S134, the communication unit 241 receives the initial quantized position information transmitted from the server 112 under the control of the communication control unit 251, and supplies the initial quantized position information to the control unit 242. That is, the communication control unit 251 acquires the initial quantized position information.

In step S135, the absolute coordinate position information decoder 131 inversely quantizes the initial quantized position information by performing the calculation similar to that of the abovementioned Equation (6) on the basis of the initial quantized position information and the division index stored in the initial quantized position information transmission request for the initial quantized position information of each object. Therefore, the decoded position information in the child space is obtained.

In step S136, the absolute coordinate position information decoder 131 converts the position information in the child space obtained for each object into the position information in the parent space.

That is, the absolute coordinate position information decoder 131 performs inverse scaling conversion by performing the calculation of the abovementioned Equation (7) and Equation (8) on the basis of the decoded position information in the child space obtained in step S135 and the child space information included in the header information. Therefore, the decoded position information in the child space is converted into the decoded position information in the parent space.

Moreover, the absolute coordinate position information decoder 131 obtains the position information indicating the position of the object in the parent space by multiplying the obtained decoded position information in the parent space by the absolute distance absoluteDistance included in the header information. Then, when the position information indicating the position of the object is obtained, the position information acquisition processing ends.

The absolute coordinate position information decoder 131 performs the processing of the above step S135 and step S136 as processing of decoding for every object.

In such a manner, the client 114 acquires and decodes the quantized position information with appropriate quantization accuracy as the initial quantized position information. Furthermore, the server 112 generates the initial quantized position information according to the request of the client 114 and transmits the initial quantized position information to the client 114.

By doing so, a code amount of the information indicating the position of the object can be reduced as compared with a case where the position information in the parent space is encoded (quantized) as it is.

<Description of Additional Bit Information Acquisition Processing and Additional Bit Information Transmission Processing>

Figure 22:
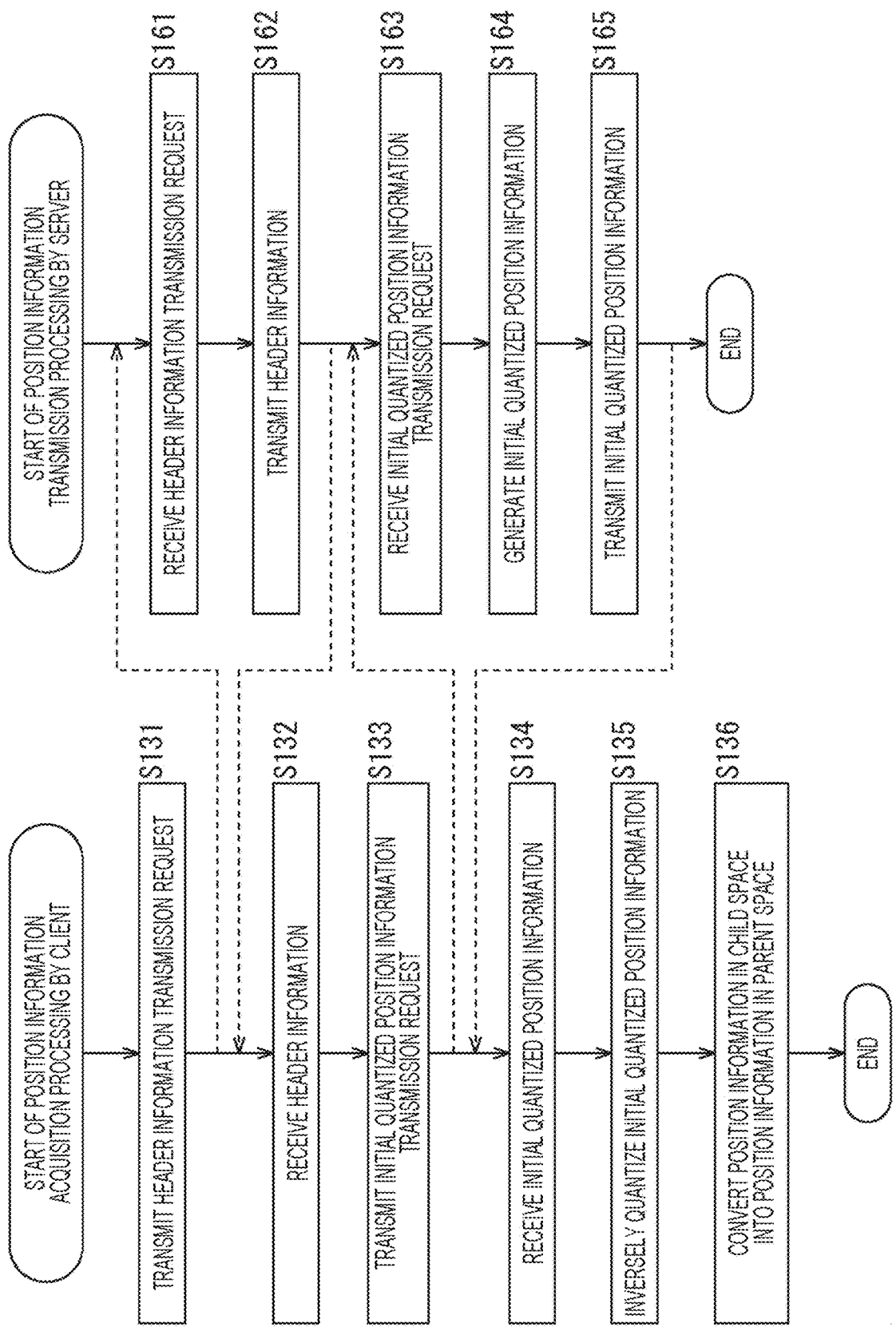
FIG. 22 is a flowchart for describing position information acquisition processing and position information transmission processing.

By the way, when the position information acquisition processing described with reference to FIG. 22 is performed, position information (hereinafter, also referred to as object position information) indicating the position of the object in the parent space is obtained for each object.

For example, in a case where the highest accuracy quantized position information is acquired as the initial quantized position information, object position information with the highest accuracy is obtained, but otherwise, accuracy of the object position information may not be sufficient.

Moreover, the initial quantized position information with relatively low quantization accuracy has been acquired, but there may be a margin in the transmission band or there may be a margin up to a reproduction time of the content, such that it may be desired to acquire the additional bit information for obtaining quantized position information with higher quantization accuracy.

Therefore, when the object position information is obtained, the client 114 acquires the additional bit information from the server 112, if necessary. Hereinafter, processing performed by the client 114 and the server 112 in such a case will be described.

Figure 23:
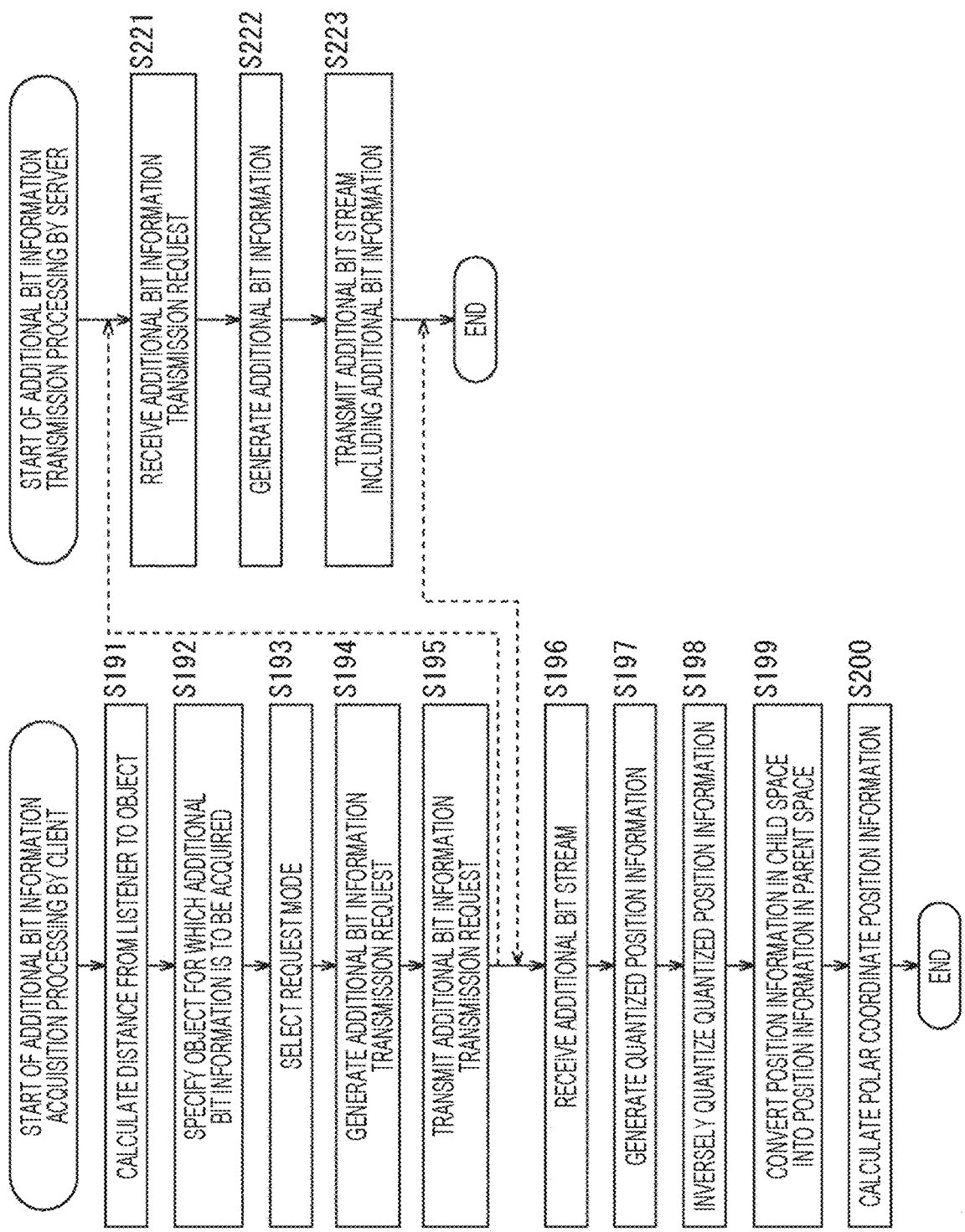
FIG. 23 is a flowchart for describing additional bit information acquisition processing and additional bit information transmission processing.

That is, additional bit information acquisition processing by the client 114 and additional bit information transmission processing by the server 112 will hereinafter be described with reference to a flowchart of FIG. 23. Note that these processing is not performed in a case where the highest accuracy quantized position information is acquired as the initial quantized position information.

When the additional bit information acquisition processing starts in the client 114, the absolute coordinate position information decoder 131 calculates the distance from the listener U12 to the object for each object, in step S191.

Specifically, an Euclidean distance from the listener U12 to the object in the parent space is calculated on the basis of the listener position information supplied from the listener position acquisition device 113 and the object position information obtained in the processing of step S136 of FIG. 22.

In step S192, the absolute coordinate position information decoder 131 specifies an object for which the additional bit information is to be acquired.

For example, whether or not the initial quantized position information, that is, the decoded position information in the parent space, as the quantized position information of the object in the parent space, is position information with sufficient accuracy can be specified by a distance from the listener U12 to a position indicated by the object position information.

Therefore, the absolute coordinate position information decoder 131 obtains a tolerance of a quantization step width from the distance from the listener U12 to the object and the perception limit angle, and compares the tolerance with the quantization step width obtained by the division index of the initial quantized position information. Then, the absolute coordinate position information decoder 131 specifies an object in which the quantization accuracy of the initial quantized position information is not sufficient, that is, an object for which the additional bit information is to be acquired, on the basis of a comparison result.

Furthermore, for example, the absolute coordinate position information decoder 131 specifies the object for which the additional bit information is to be acquired on the basis of a band situation of the transmission line with the server 112, a time from a current point in time to a reproduction time of the content, the quantization accuracy of the initial quantized position information, and the like.

Moreover, the absolute coordinate position information decoder 131 determines the requested bit length of the additional bit information, that is, the requested quantization accuracy for the object for which the additional bit information is to be acquired.

Note that whether or not to acquire the additional bit information or the requested bit length of the additional bit information can be determined in every axis direction of the XYZ coordinate system for each object.

In step S193, the absolute coordinate position information decoder 131 selects a request mode on the basis of a specification result of step S192.

Here, an appropriate request mode is selected on the basis of, for example, a situation of the transmission band, the number of objects for which the additional bit information is to be acquired, a positional relationship between a plurality of objects for which the additional bit information is to be acquired, and the like.

In step S194, the absolute coordinate position information decoder 131 generates an additional bit information transmission request on the basis of the specification result of step S192 and a selection result of the request mode in step S193. Therefore, for example, the additional bit information transmission request illustrated in FIG. 15 is generated.

The communication control unit 251 supplies the additional bit information transmission request generated in this manner to the communication unit 241, and controls the communication unit 241 to transmit the additional bit information transmission request to the server 112.

In step S195, the communication unit 241 transmits the additional bit information transmission request supplied from the control unit 242 to the server 112 under the control of the communication control unit 251.

When the additional bit information transmission request is transmitted, the additional bit information transmission processing starts in the server 112.

That is, in step S221, the communication unit 201 receives the additional bit information transmission request transmitted from the client 114 under the control of the communication control unit 211, and supplies the additional bit information transmission request to the control unit 202.

In step S222, the transmission information generation unit 212 generates additional bit information of the object for which transmission is requested according to the additional bit information transmission request supplied from the communication unit 201.

For example, the transmission information generation unit 212 generates the additional bit information by extracting bits by an additional bit length designated by the additional bit information transmission request from a position determined by the quantization accuracy (division index) of the initial quantized position information in the highest accuracy quantized position information of the encoded data file recorded in the recording unit 121. The generation of such additional bit information can be realized by bit shift.

When the transmission information generation unit 212 generates the additional bit information for a required object, the transmission information generation unit 212 stores the additional bit information in an additional bit stream in the format illustrated in FIG. 16, and the communication control unit 211 supplies the generated additional bit stream to the communication unit 201.

In step S223, the communication unit 201 transmits the additional bit stream including the additional bit information supplied from the communication control unit 211 to the client 114 under the control of the communication control unit 211, and the additional bit information transmission processing ends.

Furthermore, when the additional bit stream is transmitted, processing of step S196 is performed in the client 114.

In step S196, the communication unit 241 receives the additional bit stream transmitted from the server 112 under the control of the communication control unit 251, and supplies the additional bit stream to the control unit 242. That is, the communication control unit 251 acquires the additional bit stream including the additional bit information.

In step S197, the absolute coordinate position information decoder 131 generates the quantized position information by adding the additional bit information to a lower bit side of the initial quantized position information for the object for which the transmission of the additional bit information is requested.

In step S198, the absolute coordinate position information decoder 131 inversely quantizes the quantized position information obtained in the processing of step S197.

Then, in step S199, the absolute coordinate position information decoder 131 converts the position information in the child space obtained by the inverse quantization in step S198 into the position information in the parent space.

Note that in step S198 and step S199, processing similar to that of step S135 and step S136 of FIG. 22 is performed.

Furthermore, in step S199, the absolute coordinate position information decoder 131 obtains the object position information by multiplying the obtained decoded position information in the parent space by the absolute distance absoluteDistance.

The processing of the above step S197 to step S199 is performed only on the object for which the additional bit information has been acquired.

Furthermore, the processing of step S191 to step S199 described above may be repeatedly performed on the object position information obtained in this manner, until object position information (position information in the parent space) with sufficient quantization accuracy is obtained.

In step S200, the coordinate conversion unit 132 calculates the polar coordinate position information indicating the position of the object viewed from the listener U12 in the parent space on the basis of the object position information and the listener position information supplied from the listener position acquisition device 113, for every object.

Then, the coordinate conversion unit 132 supplies the obtained polar coordinate position information to the output unit 243, and the output unit 243 outputs the polar coordinate position information to the MPEG-H renderer 115. When the output unit 243 outputs the polar coordinate position information of all the objects to the MPEG-H renderer 115, the additional bit information acquisition processing ends.

When the additional bit information acquisition processing ends, the rendering is performed in the MPEG-H renderer 115. That is, the MPEG-H renderer 115 performs the rendering on the basis of the audio data of each object acquired from the server 112 or the like and the polar coordinate position information supplied from the output unit 243 to generate the reproduced audio data in which the sound image of the object is localized at each position in the parent space, and outputs the reproduced audio data to the reproduction system such as a speaker or the like.

In such a manner, the client 114 acquires the additional bit information, if necessary, and obtains final object position information. Furthermore, the server 112 generates and transmits the additional bit information according to the request of the client 114.

By doing so, the client 114 can obtain the position information in the parent space with sufficient accuracy with a smaller transmission amount of information than that in a case of acquiring the highest accuracy quantized position information from the server 112 from the beginning.

In addition, since both of the processing for obtaining required quantization accuracy and the processing for calculating the polar coordinate position information are performed by the client 114, it is possible to reduce a processing load on the distribution side of the content such as the server 112 or the absolute coordinate position information encoder 111.

First Modification of Second Embodiment

<Concerning Arrangement of Child Spaces>

By the way, an example of efficiently encoding the position information in the parent space by forming one or more child spaces in the parent space has been described hereinabove.

Figure 24:
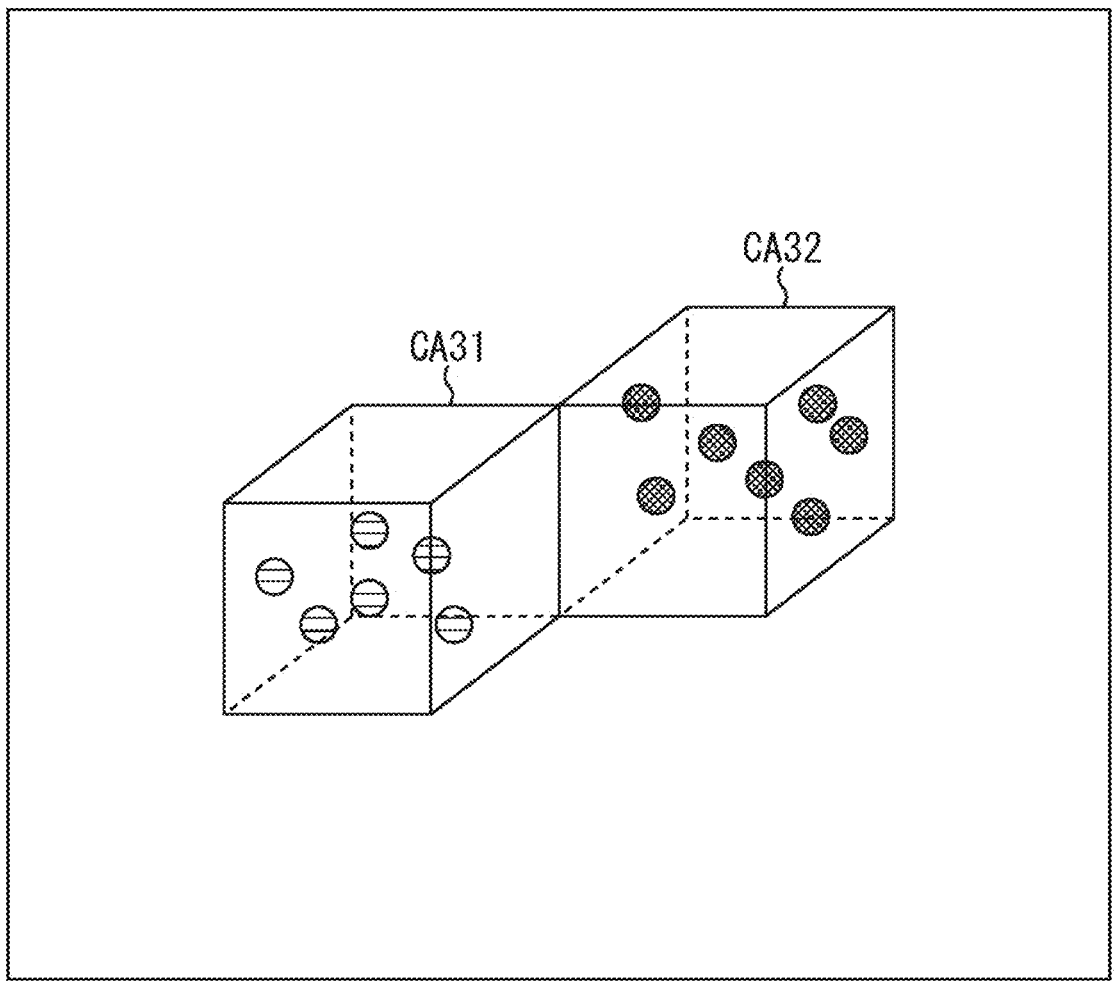
FIG. 24 is a diagram illustrating an example of a child space.

However, for example, as illustrated in FIG. 24, each of child spaces originally included in each of two different parent spaces may be arranged in one virtual parent space.

In an example illustrated in FIG. 24, a child space CA31 and a child space CA32 have been originally included in parent spaces different from each other, but here, those child space CA31 and child space CA32 are arranged in one virtual parent space.

By doing so, for example, the listener U12 can select only any one of the child space CA31 or the child space CA32 according to his/her liking. In this case, the server 112 transmits audio data of objects that are in a child space, selected by the listener U12, of the child space CA31 and the child space CA32 and quantized position information of those objects to the client 114, according to the selection of the listener U12.

Therefore, on the client 114 side, reproduction of the audio data can be performed only for the child space selected by the listener U12.

Note that in such an example, for example, the child space CA31 and the child space CA32 may be spaces having reverberation characteristics different from each other. That is, the child space CA31 and the child space CA32 may be given reverberation characteristics different from each other. Furthermore, exactly the same objects may exist in the same positional relationship in the child space CA31 and the child space CA32.

In that case, the listener U12 can reproduce audio data with different reverberation characteristics only by selecting the child space, and can thus have an experience as he/she were in different spaces even with arrangement of the same objects. Furthermore, the listener U12 can have an experience as if he/she were coming and going between a plurality of completely different spaces such as the child space CA31 and the child space CA32. Moreover, in a case where a plurality of child spaces is formed in one parent space, a child space may be formed for every attribute of each object such as an object of a musical instrument or an object of a cheer. In this case, each of objects included in each of different child spaces has attributes different from each other.

Figure 25:
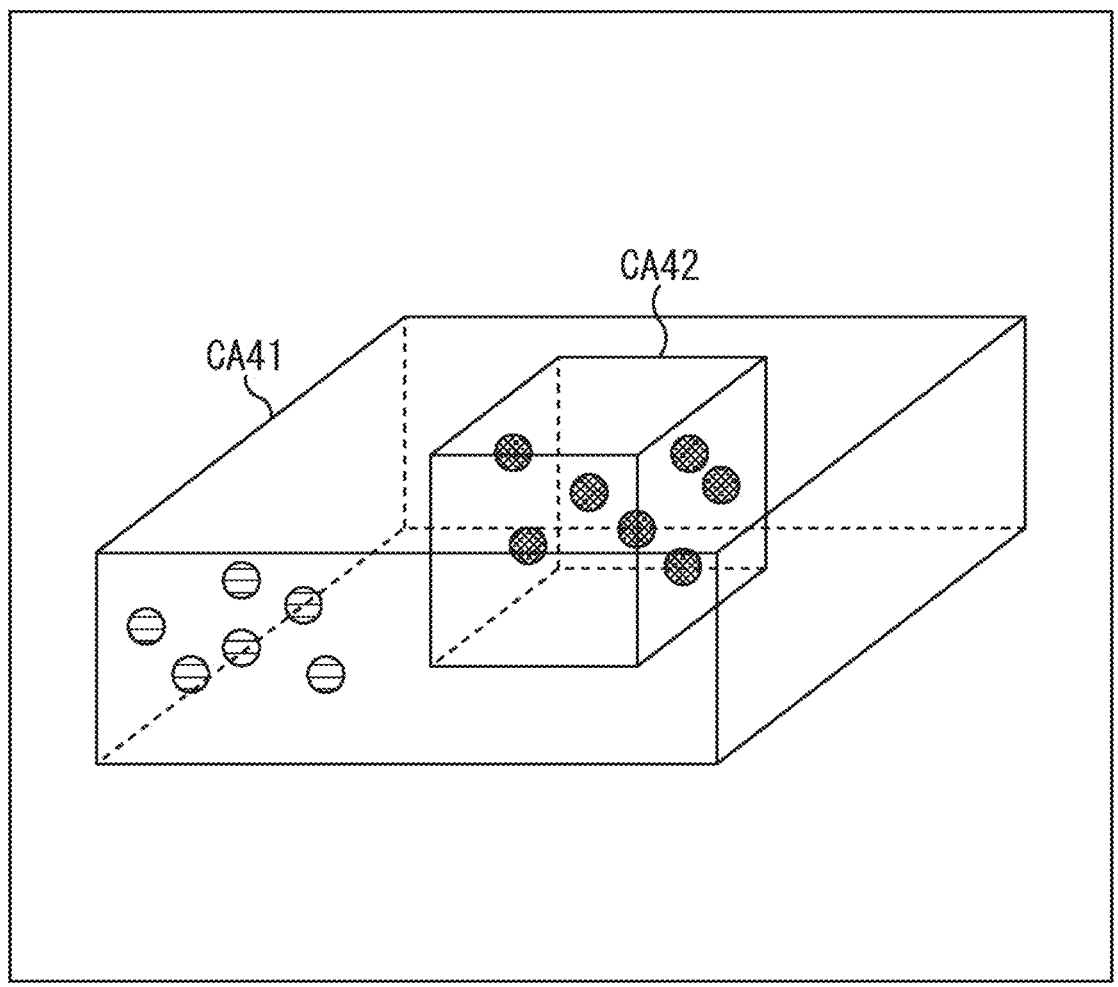
FIG. 25 is a diagram illustrating an example of a child space.

In addition, for example, as illustrated in FIG. 25, a plurality of child spaces may overlap each other. In this example, a child space CA41 and a child space CA42 are formed in one parent space, but the entire child space CA42 is included in the child space CA41.

That is, objects existing in the child space CA42 not only belongs to the child space CA42 but also belongs to the child space CA41 at the same time.

Even in such a case, the listener U12 can select any one of the child space CA41 or the child space CA42, such that audio data of objects in the selected child space can be reproduced.

In such a case, for example, when reproducing a content related to the parent space, an object to be reproduced can be changed depending on which child space is selected.

For example, assume that a content of a concert is reproduced, and assume that an object that exists only in the child space CA42 is an object of a musical instrument and an object that exists in the child space CA41 but does not exist in the child space CA42 is an object of a cheer.

In this case, if the listener U12 selects the child space CA41, both the sounds of the musical instrument and the cheer are reproduced, and if the listener U12 selects the child space CA42, only the sound of the musical instrument is reproduced. That is, it is possible to freely switch between a space including only the musical instrument and a space including not only the musical instrument but also the cheer.

In a case where one object can belong to the plurality of child spaces as in an example illustrated in FIG. 25, the header information described above is as illustrated in FIG. 26, for example.

In an example illustrated in FIG. 26, in the header information, in addition to a case of the example illustrated in FIG. 11, information indicating the number of child spaces to which the i-th object belongs, which is newly indicated by a character "numOfAttChildArea", is stored for every object. Then, following the information "numOfAttChildArea" indicating the number of child spaces to which the object belongs, object belonging information "ChildAreaIndexForObj [i]" is stored by the number indicated by the information.

Note that quantization of position information in the child space of an object that belongs to the plurality of child spaces in an overlapping manner is only required to be performed on any one of the child spaces to which the object belongs, such as, for example, a child space designated by ChildAreaIndexForObj[0], or the like. Furthermore, in a case where the same object belongs to the plurality of child spaces, it is only required to determine, in advance, for which child space position information in the child space is quantized, for the object.

That is, only the position information in the child space for one of the plurality of child spaces to which the object belongs is quantized and transmitted, and the quantized position information for the other child spaces is not transmitted. On the client 114 side, it is only required to obtain, from the position information in the child space for one child space of a certain object, the position information in the child space for another child space of the same object.

Furthermore, a format of a child space information "ChildAreaInfo( )" part in the header information illustrated in FIG. 26 is as illustrated in FIG. 27, for example. Note that the format of the child space information illustrated in FIG. 27 is the same as that illustrated in FIG. 12, and a description thereof will thus be omitted.

Second Modification of Second Embodiment

<Concerning Skip Frame>
Furthermore, in a free viewpoint audio, communication is performed between the server 112 and the client 114, such that information such as quantized position information or the like is exchanged between the server 112 and the client 114.

However, there is also a possibility that a delay will occur depending on a congestion situation of a network, that is, a transmission line, between the server 112 and the client 114, such that the client 114 cannot acquire information necessary for reproduction, such as the quantized position information or the like up to a reproduction time of audio data.

Figure 28:
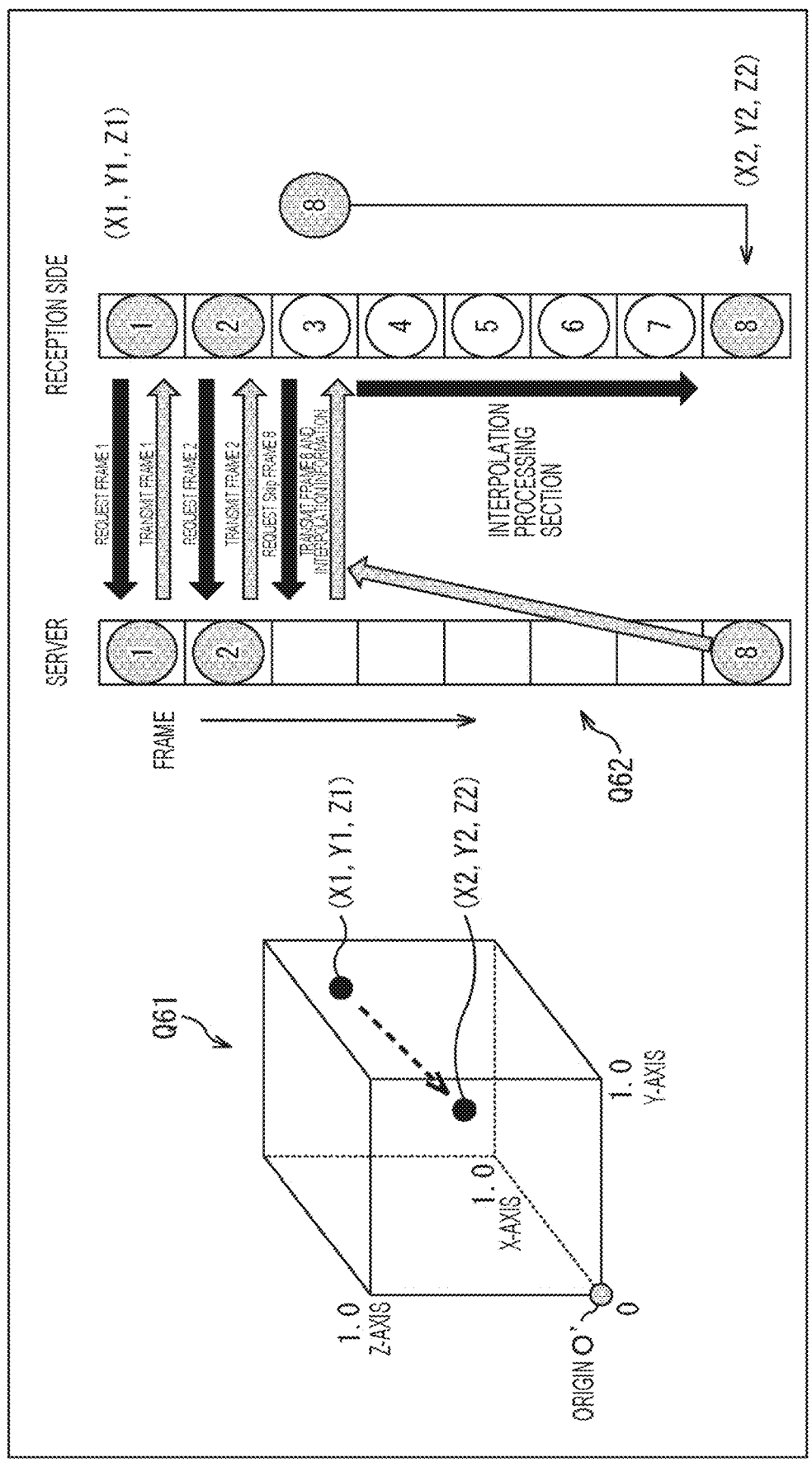
FIG. 28 is a diagram for describing skip of a frame.

Therefore, for example, in a case where a transmission delay has become large as illustrated in FIG. 28, the number of frames to be skipped may be transmitted from the client 114 to the server 112.

In this case, the server 112 transmits quantized position information of an object temporally preceding by the number of skip frames designated by the client 114 and interpolation information from a current reproduction time to a time of the skip frame.

For example, as illustrated by arrow Q61 in FIG. 28, assume that a content in which an object that was at a position (X1, Y1, Z1) in the XYZ coordinate system in frame 1 is moving to a position (X2, Y2, Z2) in the XYZ coordinate system in frame 8 after seven frames is reproduced.

At this time, as illustrated by arrow Q62, assume that quantized position information could be transmitted and received without a delay, up to frame 1 and frame 2, but at this point in time, the client 114 has determined that a band of a transmission line is narrow, such that it is likely that a delay will occur.

Then, the client 114 does not request the server 112 to transmit initial quantized position information of frame 3, but instead requests the server 112 to transmit the number of request skip frames designating frame 8 and interpolation information used for interpolation processing.

Here, the number of request skip frames is information indicating the number of frames that skip the transmission of the quantized position information. Here, for example, since the number "5" of request skip frames is transmitted to the server 112, the server 112 skips five frames after frame 2 in which the transmission has been completed, and transmits quantized position information and interpolation information for the next frame 8.

Therefore, on the client 114 side, position information in the parent space can be obtained by decoding processing for the quantized position information of frame 8. Furthermore, the client 114 can obtain position information in the parent space in frame 3 to frame 7 by interpolation processing on the basis of position information in the parent space of frame 2, position information in the parent space of frame 8, and interpolation information.

By performing such interpolation processing, it is possible to obtain a position of the object moving from the position (X1, Y1, Z1) to the position (X2, Y2, Z2) at an arbitrary timing (frame).

In a case where the client 114 transmits the number of request skip frames to the server 112 as such, the initial quantized position information transmission request transmitted by the client 114 is as illustrated in FIG. 29, for example.

In an example illustrated in FIG. 29, the initial quantized position information transmission request further includes the number of request skip frames indicated by a character "SkipFrameRequest", in addition to the division indices "exp_index_initial_x[i]", "exp_index_initial_y[i]", and "exp_index_initial_z[i]" in each axis direction of the i-th object illustrated in FIG. 13.

Furthermore, the server 112 that has received the initial quantized position information transmission request illustrated in FIG. 29 transmits the initial quantized position information in a bit stream format illustrated in FIG. 30, for example.

In an example illustrated in FIG. 30, the bit stream includes interpolation information indicated by a character "InterpolMode[i]", in addition to the initial quantized position information "Xpos_initial[i]", "Ypos_initial[i]", and "Zpos_initial[i]" illustrated in FIG. 14.

In particular, here, the interpolation information InterpolMode [i] is information indicating whether to perform linear interpolation or quadratic interpolation on the i-th object. However, in a case where the initial quantized position information transmission request illustrated in FIG. 13 rather than FIG. 29 is received from the client 114, the interpolation information InterpolMode [i] is not stored in the bit stream.

For example, in a case where the object is moving in a motion corresponding to a uniform motion, it is only required to perform the linear interpolation, and in a case where the object is moving in a motion corresponding to a uniformly accelerated motion, it is only required to perform the quadratic interpolation.

Note that here, an example in which any of the linear interpolation and the quadratic interpolation is selectively performed is described, but other interpolation methods may be used, of course. Furthermore, a coefficient used for the interpolation processing may be stored as the interpolation information or a coefficient itself used for the interpolation processing may be held in advance by the client 114.

Moreover, in the example illustrated in FIG. 30, the initial quantized position information stored in the bit stream is initial quantized position information of the preceding frame skipped by the number of request skip frames.

<Description of Position Information Acquisition Processing and Position Information Transmission Processing>

Here, processing performed in a case where the client 114 transmits the initial quantized position information transmission request illustrated in FIG. 29 due to a delay or the like in the transmission line will be described.

Figure 31:
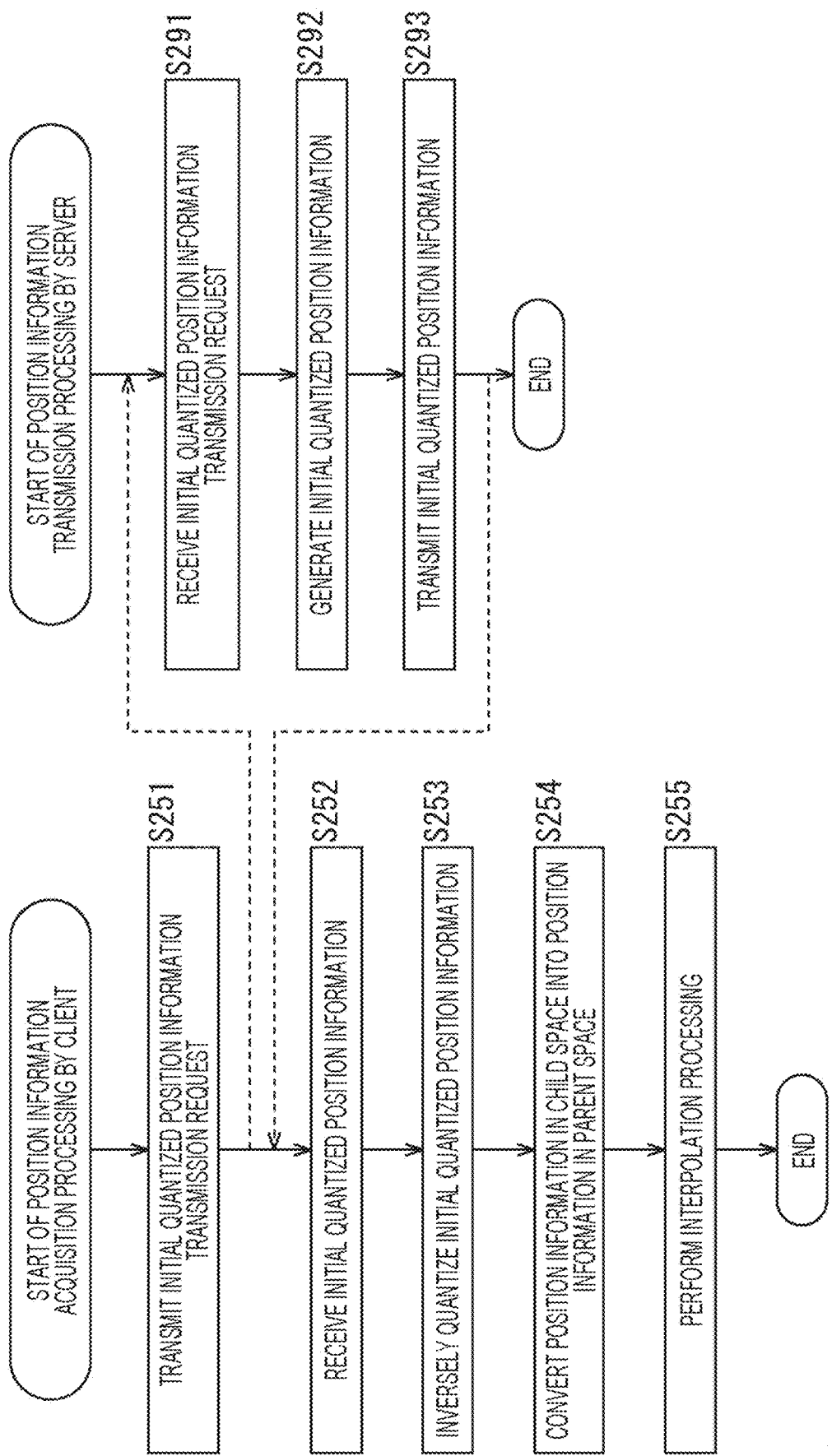
FIG. 31 is a flowchart for describing position information acquisition processing and position information transmission processing.

That is, position information acquisition processing by the client 114 and position information transmission processing by the server 112 will hereinafter be described with reference to a flowchart of FIG. 31.

Note that the control unit 242 determines whether or not perform the skip of frames for the quantized position information or how many frames to skip, on the basis of, for example, a band situation of the transmission line, that is, a traffic of a network, between the server 112 and the client 114 or a time stamp at the time of reproduction of the content, that is, a reproduction situation of the content.

When the position information acquisition processing starts by the client 114, the communication unit 241 transmits the initial quantized position information transmission request supplied from the control unit 242 to the server 112 under the control of the communication control unit 251, in step S251.

That is, the control unit 242 generates the initial quantized position information transmission request illustrated in FIG. 29 on the basis of the traffic of the network, the reproduction situation of the content, or the like, and supplies the initial quantized position information transmission request to the communication unit 241. This initial quantized position information transmission request includes the number of request skip frames.

Then, in the server 112, in step S291, the communication unit 201 receives the initial quantized position information transmission request transmitted from the client 114 under the control of the communication control unit 211, and supplies the initial quantized position information transmission request to the control unit 202.

In step S292, the transmission information generation unit 212 generates initial quantized position information with reference to the encoded data file recorded in the recording unit 121 according to the initial quantized position information transmission request supplied from the communication unit 201.

In this case, for example, in the bit stream format illustrated in FIG. 30, a bit stream including initial quantized position information of a first frame after skip and interpolation information is generated. The communication control unit 211 supplies the bit stream generated in this manner to the communication unit 201. At this time, the transmission information generation unit 212 specifies a motion of the object from quantized position information, that is, a position of the object, in frames before and after the skip or skipped frames, and allows the interpolation information according to the specification result to be included in the bit stream.

In step S293, the communication unit 201 transmits the bit stream supplied from the communication control unit 211, that is, the initial quantized position information of each object to the client 114 under the control of the communication control unit 211, and the position information transmission processing ends.

When the initial quantized position information is transmitted by the server 112, the communication unit 241 receives the initial quantized position information transmitted from the server 112 under the control of the communication control unit 251, and supplies the initial quantized position information to the control unit 242, in step S252.

When the initial quantized position information is acquired, processing of step S253 and step S254 is thereafter performed, but these processing is similar to the processing of step S135 and step S136 of FIG. 22, and a description thereof will thus be omitted. However, here, the processing is performed on the first frame after the skip, such that decoded position information in the parent space of that frame is obtained.

In step S255, the absolute coordinate position information decoder 131 performs interpolation processing indicated by the interpolation information received together with the initial quantized position information in step S252, on the basis of the decoded position information in the parent space of the frame after the skip obtained in step S254 and the decoded position information in the parent space of the frame before the skip obtained immediately before.

That is, for example, the absolute coordinate position information decoder 131 generates decoded position information in the parent space of each skipped frame by performing the processing indicated by the interpolation information, that is, the linear interpolation or the quadratic interpolation.

Moreover, the absolute coordinate position information decoder 131 obtains the object position information in each frame by multiplying the decoded position information in the parent space of each frame by the absolute distance absoluteDistance, for the skipped frames and the first frame after the skip obtained by the above processing. When the object position information is obtained in this manner, the position information acquisition processing ends.

In such a manner, the client 114 transmits the initial quantized position information transmission request including the number of request skip frames when skipping some frames, and obtains the position information in the parent space of the frame after the skip and obtains the position information in the parent space of the skipped frames by the interpolation processing. Furthermore, the server 112 transmits the initial quantized position information and the interpolation information to the client 114 according to the number of request skip frames.

By doing so, it is possible to suppress that a delay occurs in reproducing the content even in a case where the delay occurs in the transmission line.

As described above, according to the present technology, it is possible to transmit the information indicating the positions of the objects while maintaining the required accuracy with a small transmission amount by transmitting the information indicating the positions of the objects using the child space in a case where existence positions of the objects are biased in the parent space.

Furthermore, as in the first modification of the second embodiment, by treating two or more completely different spaces as the respective child spaces, and managing those child spaces within one parent space, the listener can have an experience as if he/she were coming and going between a plurality of completely different spaces by decoding only a necessary child space.

Moreover, as in the second modification of the second embodiment, even in a case where the transmission line is congested, such that a required bit stream does not reach up to the reproduction time, the object can be smoothly moved and reproduced by look-ahead and interpolation.

<Configuration Example of Computer>

By the way, the series of processing described above can be executed by hardware or can be executed by software. In a case where the series of processing is executed by the software, programs configuring the software are installed in a computer. Here, the computer includes a computer incorporated in dedicated hardware, or, for example, a general-purpose personal computer that can execute various functions by installing various programs, or the like.

Figure 32:
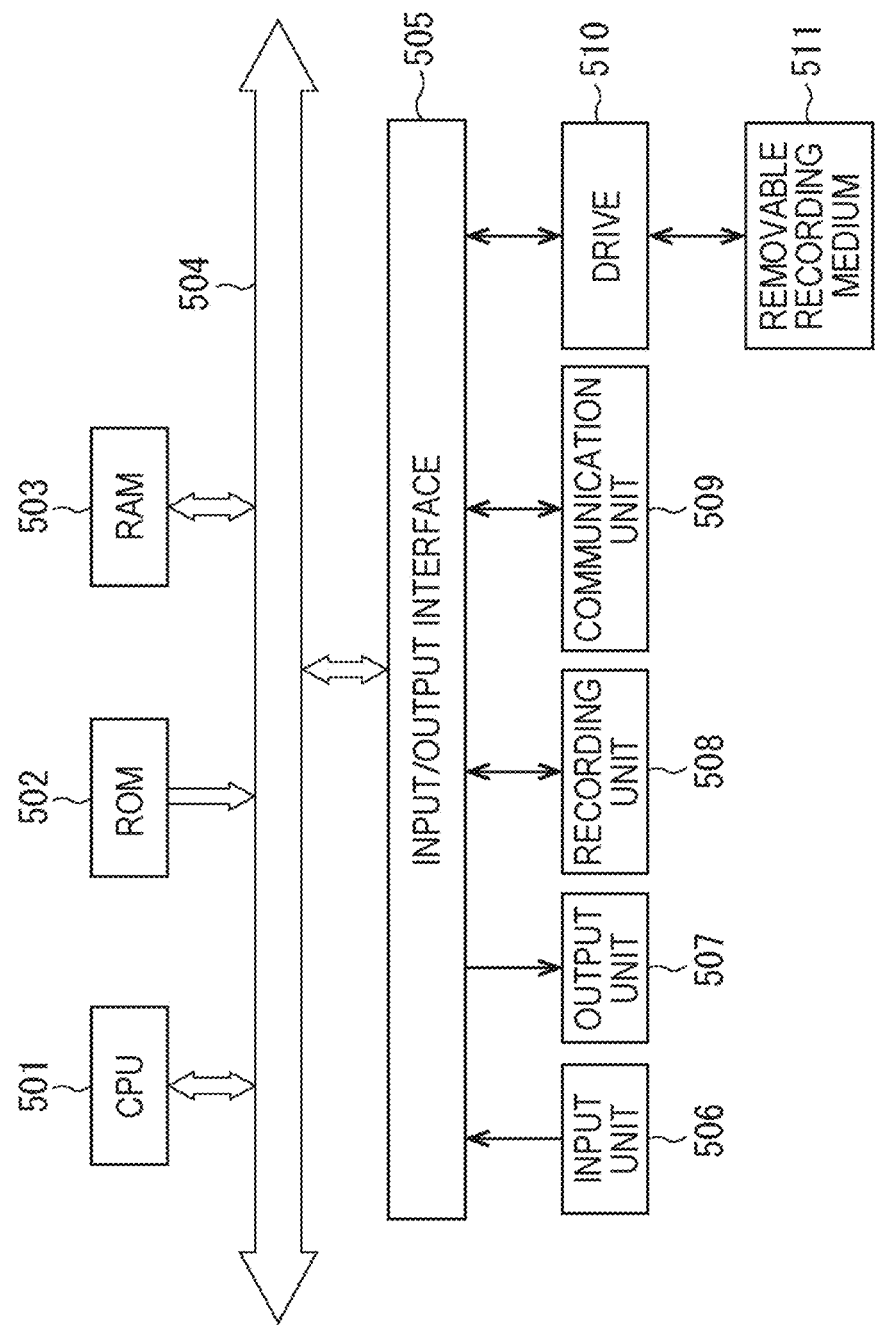
FIG. 32 is a diagram illustrating a configuration example of a computer.

FIG. 32 is a block diagram illustrating a configuration example of hardware of a computer that executes the series of processing described above by a program.

In the computer, a central processing unit (CPU) 501, a read only memory (ROM) 502, and a random access memory (RAM) 503 are connected to each other by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an image capturing element, and the like. The output unit 507 includes a display, a speaker, and the like. The recording unit 508 includes a hard disk, a nonvolatile memory, or the like. The communication unit 509 includes a network interface and the like. The drive 510 drives a removable recording medium 511 such as a magnetic disk, an optical disk, a magneto-optical disk, a semiconductor memory, or the like.

In the computer configured as described above, the CPU 501 performs the series of processing described above by loading, for example, a program recorded in the recording unit 508 into the RAM 503 via the input/output interface 505 and the bus 504 and executing the program.

The program executed by the computer (CPU 501) can be recorded and provided on the removable recording medium 511 as, for example, a package medium and the like. Furthermore, the program can be provided via a wired or wireless transmission medium such as a local area network, the Internet, or digital satellite broadcasting.

In the computer, the program can be installed in the recording unit 508 via the input/output interface 505 by mounting the removable recording medium 511 on the drive 510. Furthermore, the program can be received by the communication unit 509 via the wired or wireless transmission medium and be installed in the recording unit 508. In addition, the program can be installed in the ROM 502 or the recording unit 508 in advance.

Note that the program executed by the computer may be a program by which processing is performed in time series according to the order described in the present specification or may be a program by which processing is performed in parallel or at a necessary timing such as a timing when a call is made, or the like.

Furthermore, embodiments of the present technology are not limited to the embodiments described above, and various modifications can be made without departing from the scope of the present technology.

For example, the present technology can have a configuration of cloud computing in which one function is shared and jointly processed by a plurality of devices via a network.

Furthermore, the respective steps described in the above-mentioned flowcharts can be executed by one device or can be executed in a shared manner by a plurality of devices.

Moreover, in a case where a plurality of processing is included in one step, the plurality of processing included in one step can be executed by one device or can be executed in a shared manner by a plurality of devices.

Moreover, the present technology can also have the following configurations.

(1)
An information processing device including:
an acquisition unit that acquires space information regarding a position and a size of a child space within a parent space and position information in the child space indicating a position of an object within the child space, the child space being included in the parent space, and the object being included in the child space; and
a calculation unit that calculates position information in the parent space indicating a position of the object within the parent space on the basis of the space information and the position information in the child space.

(2)
The information processing device according to (1), in which
the parent space is represented by absolute coordinates.

(3)
The information processing device according to (1) or (2), in which
the space information is a conversion coefficient for coordinate conversion.

(4)
The information processing device according to (3), in which
the conversion coefficient is a parameter of a linear function.

(5)
The information processing device according to (1) or (2), in which
the space information is information indicating a position of a vertex that becomes a reference of the child space within the parent space and information indicating a position of a diagonal vertex of the child space with respect to the vertex within the parent space.

(6)
The information processing device according to any one of (1) to (5), in which
the child space is represented by absolute coordinates.

(7)
The information processing device according to any one of (1) to (6), in which
a plurality of the child spaces is included in the parent space.

(8)
The information processing device according to (7), in which
each of the objects included in each of the plurality of the child spaces has attributes different from each other.

(9)
The information processing device according to (7), in which
the plurality of the child spaces overlaps each other.

(10)
The information processing device according to (7), in which
the plurality of the child spaces has reverberation characteristics different from each other.

(11)
The information processing device according to any one of (1) to (10), in which
the child space includes a plurality of the objects.

(12)
The information processing device according to any one of (1) to (11), in which
one the object is included in a plurality of the child spaces.

(13)

The information processing device according to any one of (1) to (12), in which the acquisition unit further acquires additional position information for obtaining the position information in the child space with higher accuracy than the acquired position information in the child space, and the calculation unit calculates position information in the parent space on the basis of the position information in the child space with the higher accuracy and the space information, the position information in the child space with the higher accuracy being obtained on the basis of the acquired position information in the child space and the additional position information.

(14)

The information processing device according to any one of (1) to (13), in which the object is an audio object.

(15)

An information processing method executed by an information processing device, including:

acquiring space information regarding a position and a size of a child space within a parent space and position information in the child space indicating a position of an object within the child space, the child space being included in the parent space, and the object being included in the child space; and calculating position information in the parent space indicating a position of the object within the parent space on the basis of the space information and the position information in the child space.

(16)

A program for causing a computer to execute processing including steps of:

acquiring space information regarding a position and a size of a child space within a parent space and position information in the child space indicating a position of an object within the child space, the child space being included in the parent space, and the object being included in the child space; and calculating position information in the parent space indicating a position of the object within the parent space on the basis of the space information and the position information in the child space.

REFERENCE SIGNS LIST

11 Encoder
21 Acquisition unit
22 Encoding unit
23 Communication unit
31 Child space determination unit
32 Conversion unit
33 Quantization unit
61 Decoder
71 Acquisition unit
72 Decoding unit
73 Output unit
81 Inverse quantization unit
82 Conversion unit

The invention claimed is:

1. An information processing device comprising:
processing circuitry configured to:
acquire encoded data including space information regarding a position and a size of a child space within a parent space and position information in the child space indicating a position of an audio object within the child space, the child space being included in the parent space, and the audio object being included in the child space, wherein the space information includes information indicating a position of a vertex that becomes a reference of the child space within the parent space and information indicating a position of a diagonal vertex of the child space with respect to the vertex within the parent space;

calculate position information in the parent space indicating a position of the audio object within the parent space on a basis of the space information and the position information in the child space; and output decoded data based on the position of the audio object within the parent space.

2. The information processing device according to claim 1, wherein
the parent space is represented by absolute coordinates.

3. The information processing device according to claim 1, wherein
the space information includes an inverse scaling conversion coefficient for coordinate conversion.

4. The information processing device according to claim 3, wherein
the inverse scaling conversion coefficient includes a parameter of a linear function.

5. The information processing device according to claim 1, wherein
the child space is represented by absolute coordinates.

6. The information processing device according to claim 1, wherein a plurality of child spaces is included in the parent space.

7. The information processing device according to claim 6, wherein audio objects included in each of the plurality of child spaces have attributes different from each other.

8. The information processing device according to claim 6, wherein child spaces of the plurality of child spaces overlap each other.

9. The information processing device according to claim 6, wherein child spaces of the plurality of child spaces have reverberation characteristics different from each other.

10. The information processing device according to claim 1, wherein
the child space includes a plurality of audio objects.

11. The information processing device according to claim 1, wherein
the audio object is included in a plurality of child spaces.

12. The information processing device according to claim 1, wherein
the processing circuitry is configured to acquire additional position information for obtaining the position information in the child space with higher accuracy than the acquired position information in the child space, and to calculate position information in the parent space on a basis of the position information in the child space with the higher accuracy and the space information, the position information in the child space with the higher accuracy being obtained on a basis of the acquired position information in the child space and the additional position information.

13. An information processing method executed by processing circuitry, the method comprising:
acquiring encoded data including space information regarding a position and a size of a child space within a parent space and position information in the child space indicating a position of an audio object within the child space, the child space being included in the parent space, and the audio object being included in the child space, wherein the space information includes information indicating a position of a vertex that becomes a reference of the child space within the parent space and information indicating a position of a diagonal vertex of the child space with respect to the vertex within the parent space;

calculating position information in the parent space indicating a position of the audio object within the parent space on a basis of the space information and the position information in the child space; and outputting decoded data based on the position of the audio object within the parent space.

14. A non-transitory computer readable medium storing instructions that, when executed by processing circuitry, perform an information processing method comprising:

acquiring encoded data including space information regarding a position and a size of a child space within a parent space and position information in the child space indicating a position of an audio object within the child space, the child space being included in the parent space, and the audio object being included in the child space, wherein the space information includes information indicating a position of a vertex that becomes a reference of the child space within the parent space and information indicating a position of a diagonal vertex of the child space with respect to the vertex within the parent space;

calculating position information in the parent space indicating a position of the audio object within the parent space on a basis of the space information and the position information in the child space; and outputting decoded data based on the position of the audio object within the parent space.

* * * * *